US008792743B2

United States Patent
Komatsu et al.

(10) Patent No.: US 8,792,743 B2
(45) Date of Patent: Jul. 29, 2014

(54) IMAGE PROCESSING APPARATUS AND PROGRAM

(75) Inventors: Satoru Komatsu, Yokohama (JP); Takashi Kawai, Yokohama (JP); Jun-ichi Machida, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 179 days.

(21) Appl. No.: 13/576,347

(22) PCT Filed: Jan. 27, 2011

(86) PCT No.: PCT/JP2011/052202
§ 371 (c)(1), (2), (4) Date: Jul. 31, 2012

(87) PCT Pub. No.: WO2011/096457
PCT Pub. Date: Aug. 11, 2011

(65) Prior Publication Data
US 2012/0301042 A1    Nov. 29, 2012

(30) Foreign Application Priority Data

Feb. 3, 2010 (JP) ................. 2010-022192
Feb. 16, 2010 (JP) ................. 2010-031186

(51) Int. Cl.
*G06K 9/00* (2006.01)
*G06K 9/40* (2006.01)
*G09G 5/02* (2006.01)

(52) U.S. Cl.
USPC ........... 382/254; 382/162; 382/115; 382/124; 345/589

(58) Field of Classification Search
None
See application file for complete search history.

(56) References Cited

U.S. PATENT DOCUMENTS 7,092,568 B2 *  8/2006 Eaton ............................ 382/181
(Continued)

FOREIGN PATENT DOCUMENTS

| JP | 7-177372 A | 7/1995 |
| JP | 10-243240 A | 9/1998 |
| JP | 2002-112022 A | 4/2002 |
| JP | 2004-219731 A | 8/2004 |

OTHER PUBLICATIONS

Yuxing Wu; Hirai, K.; Horiuchi, T., "Investigation of Japanese Onomatopoeias as Features for SHITSUKAN-Based Image Retrieval," Multimedia (ISM), 2013 IEEE International Symposium on, vol., no., pp. 399,400, Dec. 9-11, 2013.*

(Continued)

*Primary Examiner* — Andrae S Allison
(74) *Attorney, Agent, or Firm* — Canon USA Inc IP Division

(57) ABSTRACT

An image processing apparatus that can be applied to a wide range of general images and that is capable of improving shitsukan of materials depicted in an image by interactively adjusting multiple physical image characteristics of an image based on human latent sensations. Physical image-characteristic parameters are extracted from an input image. The image-characteristic parameters are processed using a first numerical conversion equation, and various low-order-sensitivity parameters quantifying general latent sensations are calculated. The low-order-sensitivity parameters are processed using a second numerical conversion equation, and high-order-sensitivity parameters quantifying shitsukan for different materials are calculated. An output image of which the shitsukan in the input image are improved by combining various types of image processing for changing the image characteristics so that the high-order-sensitivity parameters approach predetermined values is generated.

28 Claims, 21 Drawing Sheets

(56) References Cited

U.S. PATENT DOCUMENTS

| | | | |
|---|---|---|---|
| 7,330,189 B2* | 2/2008 | Nichogi et al. | 345/589 |
| 7,707,218 B2* | 4/2010 | Gocht et al. | 707/758 |
| 8,194,986 B2* | 6/2012 | Conwell | 382/224 |
| 8,520,979 B2* | 8/2013 | Conwell | 382/305 |
| 8,606,021 B2* | 12/2013 | Conwell | 382/224 |
| 2003/0043271 A1* | 3/2003 | Dantwala | 348/207.1 |
| 2004/0183828 A1* | 9/2004 | Nichogi et al. | 345/745 |
| 2006/0012677 A1* | 1/2006 | Neven et al. | 348/61 |

OTHER PUBLICATIONS

Motoyuki Akamatsu et al., Handbook of Visual Information Processing, 2000, pp. 194-195, Asakura Shoten, Tokyo, Japan.

Junichiro Sunai et al., Phenomenological Approach to the Evaluation of Places: A Study on the Construct System Associated with Place Evaluation, Journal of Architecture, Planning and Environmental Engineering, (Mar. 1986), vol. 367, pp. 15-21, Architectural Institute of Japan.

Hideki Toyoda, Introduction to Structural Equation Modeling: Covariance Structure Analysis, 1988, Chapter 6, pp. 90-91.

* cited by examiner

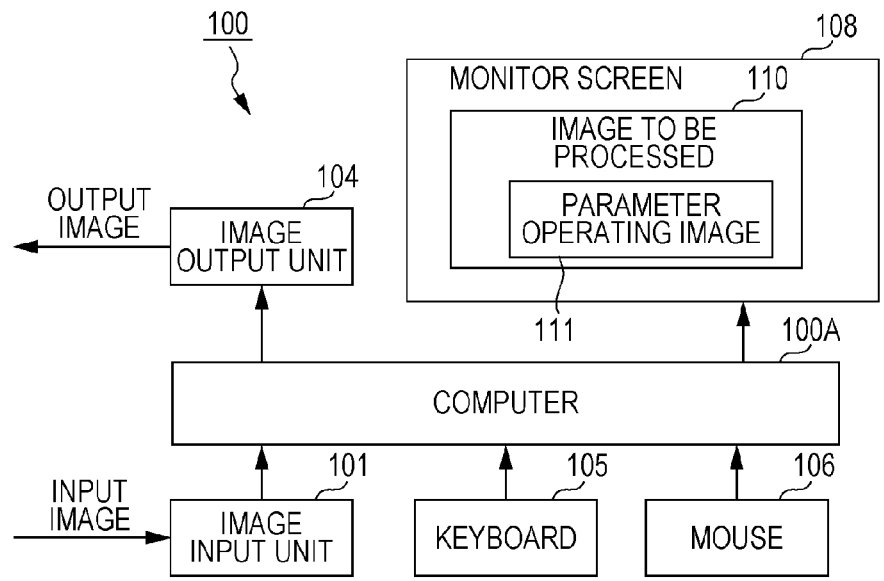
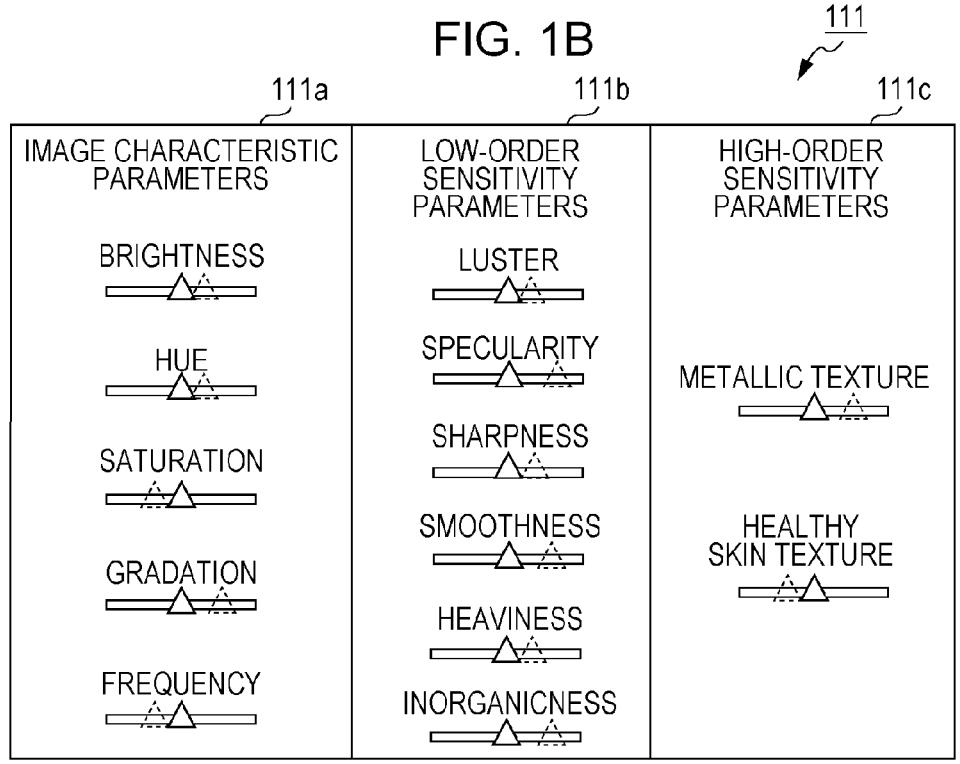

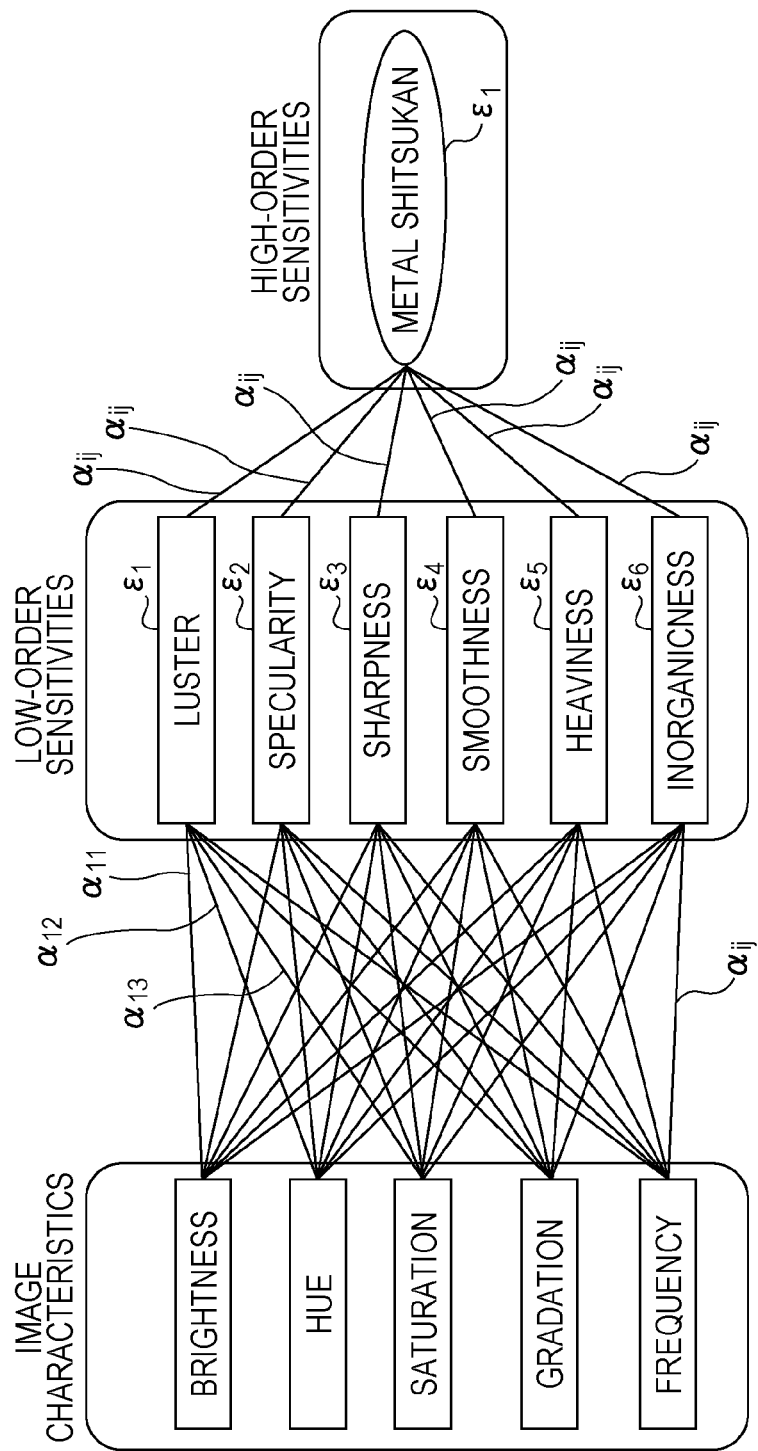

FIG. 15
(a) INPUT IMAGE
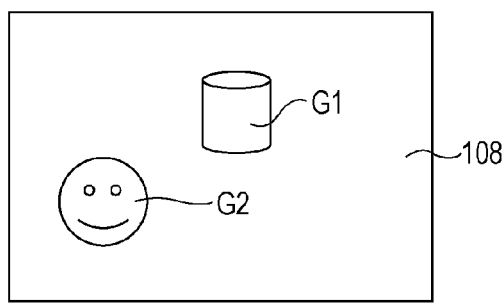
(b) SELECT METAL PART
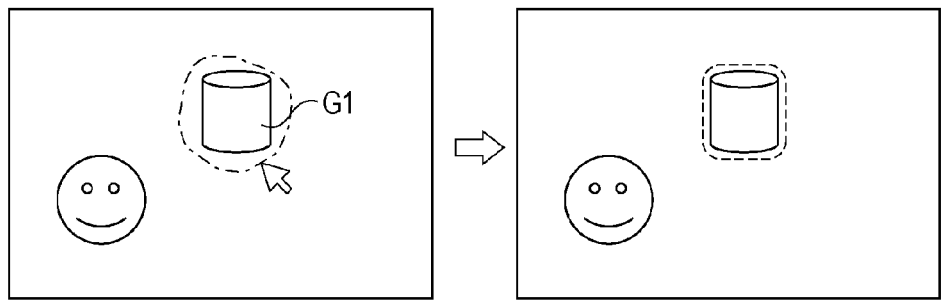
(c) SELECT PROCESSING
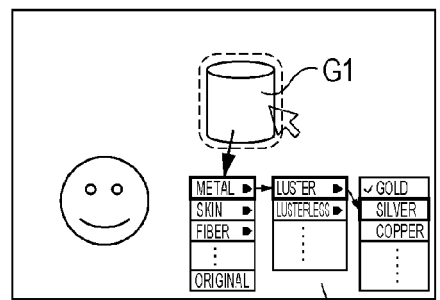
(e) PROCESSING SELECTION IMAGE
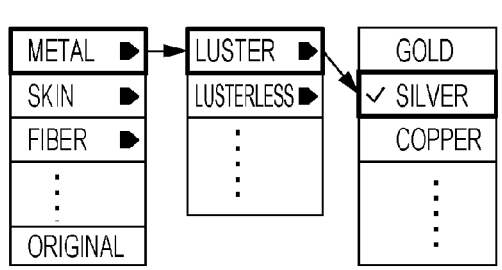
(d) PROCESSED IMAGE
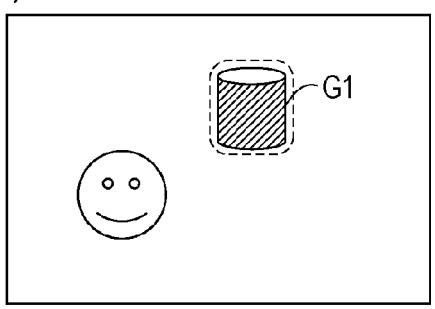

FIG. 16
(a) SELECT FACE
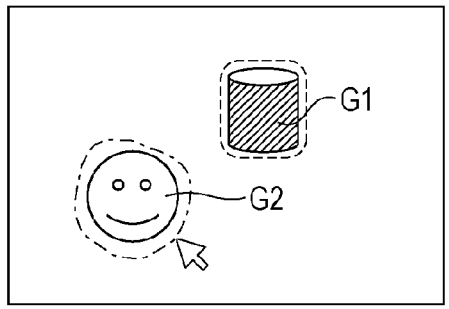
(b) SELECT PROCESSING
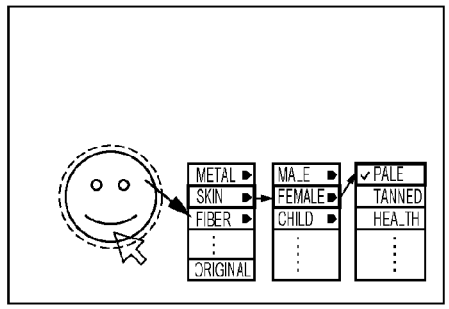
(e) PROCESSING SELECTION IMAGE
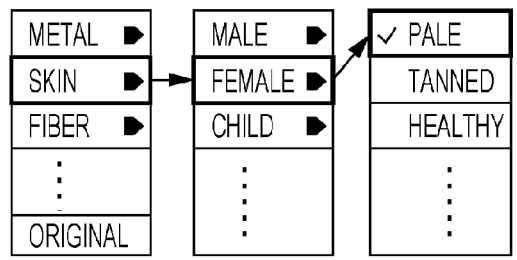
(c) PROCESSED IMAGE
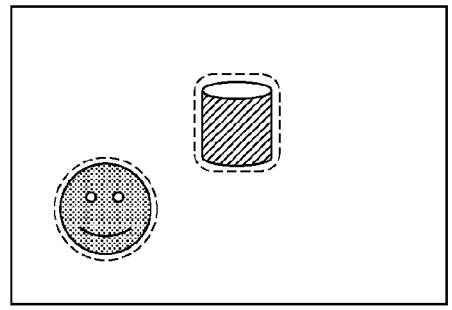
(d) OUTPUT IMAGE
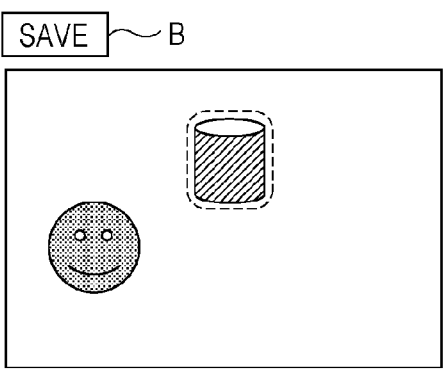

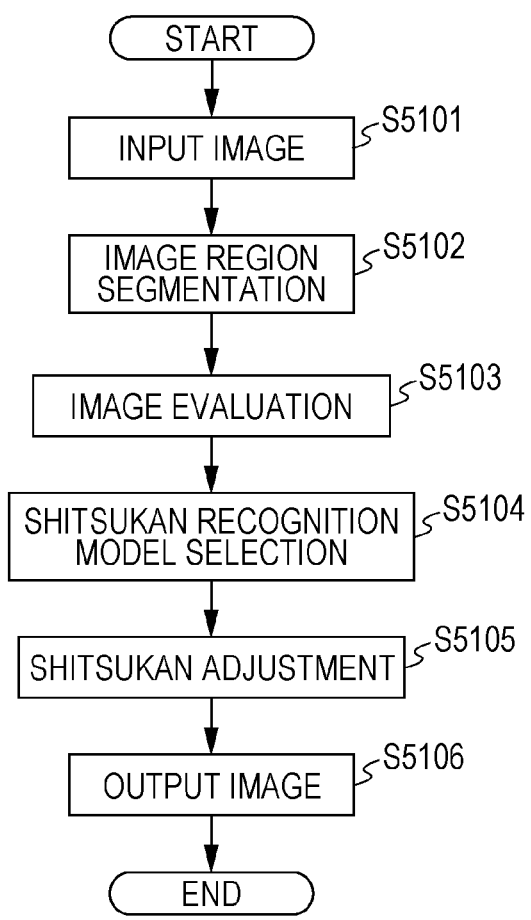

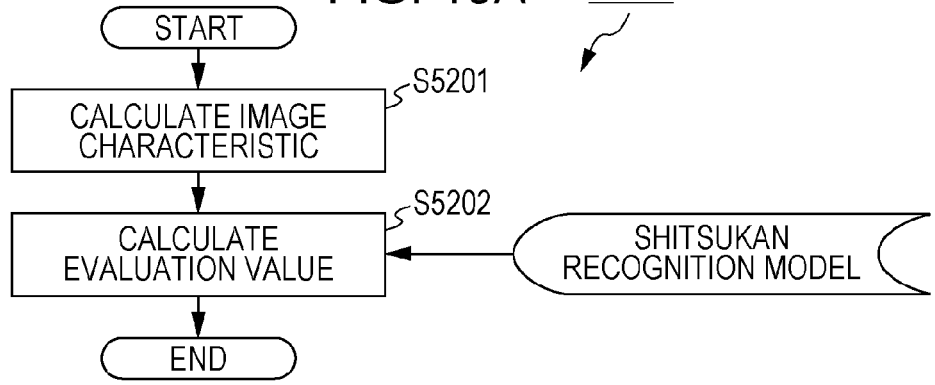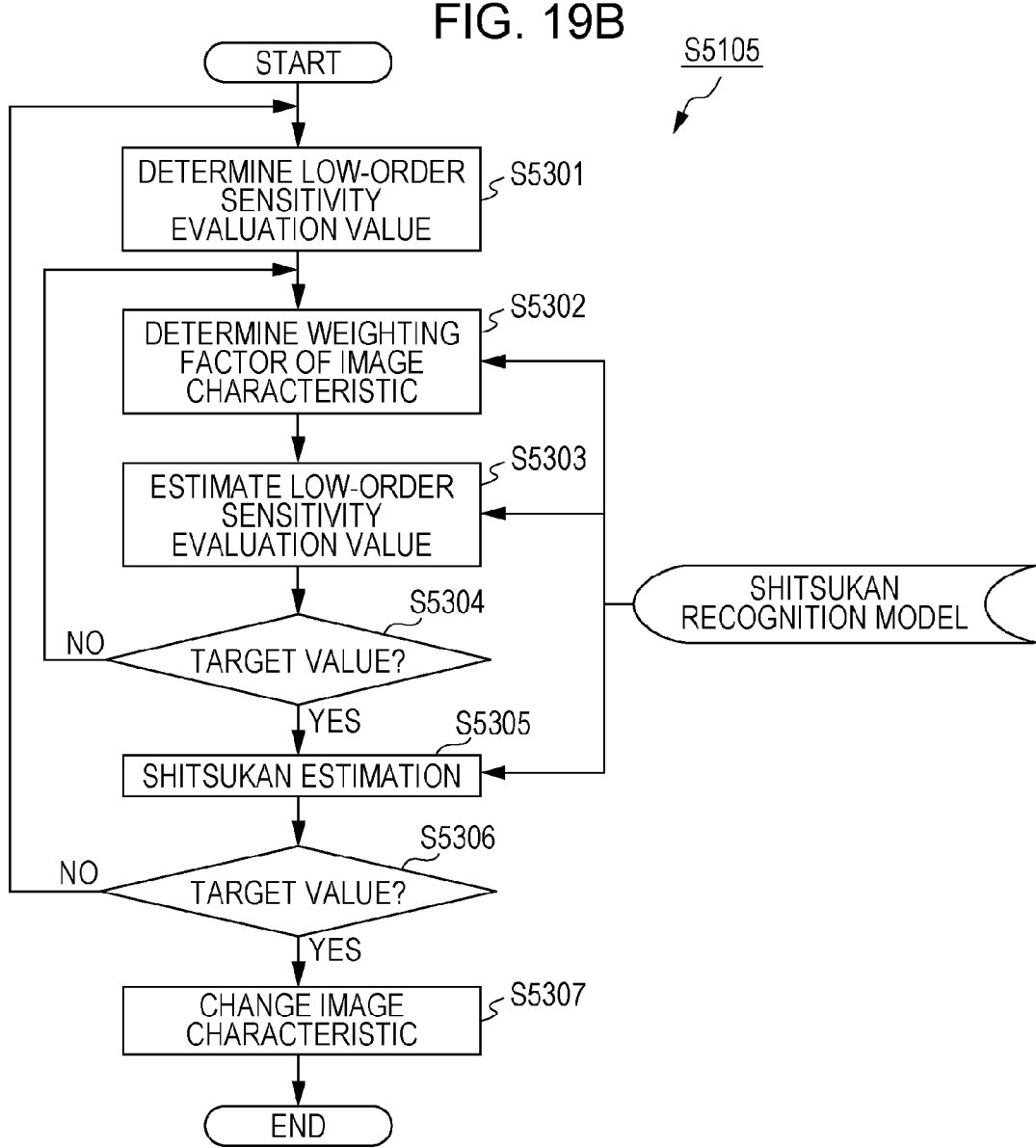

FIG. 20
(a) DISPLAY PARAMETERS
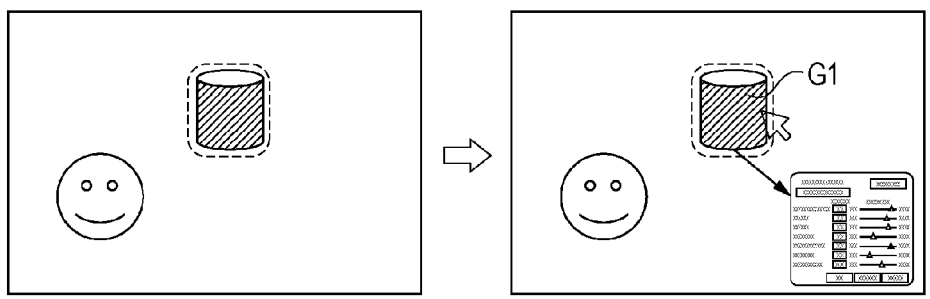
(b) PARAMETER IMAGE
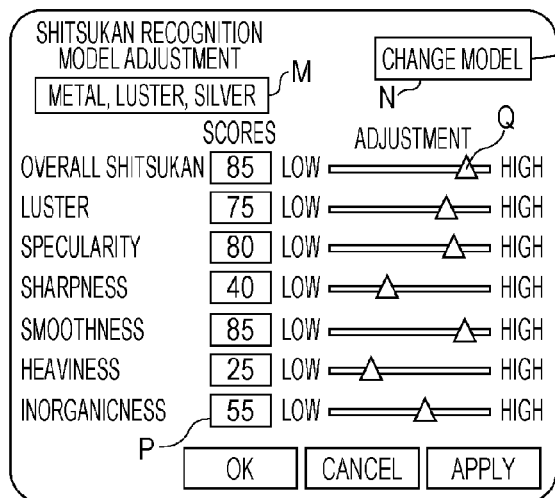
(c) PROCESSING SELECTION IMAGE
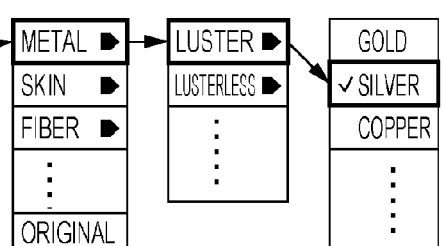
(d) DISPLAY CONTENT OF PROCESSING
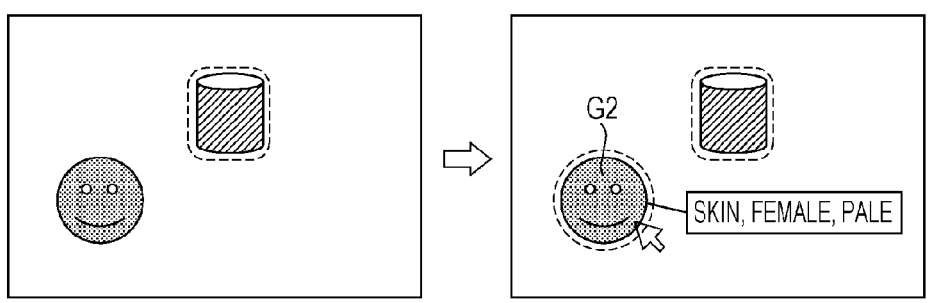

IMAGE PROCESSING APPARATUS AND PROGRAM

TECHNICAL FIELD

The present invention relates to an image processing apparatus and a program that convert an input image to an output image having shitsukan, which is a term used to describe perception of material and surface quality, different from that of the input image.

BACKGROUND ART

Image display apparatuses, such as digital cameras, video cameras, televisions, mobile phones, TV game devices, and color printers, are provided with image processing apparatuses that convert input images to output images having shitsukan different from that of the input images. Such an image processing apparatus is provided with a program for regular shitsukan adjustment, such as skin-color adjustment, that can be ran by a computer, such as a microcomputer or a high-speed logic element.

An image processing program for individually changing and adjusting physical image characteristics of an original image is put to practical use. The program enables such change and adjustment by inputting an image to a personal computer and manually setting various parameters of the image via a screen. Such a program may provide various filtering effects and improve image shitsukan by simultaneously changing various different image characteristics (such as brightness, hue, saturation, gradation, and frequency) that are linked together.

Unfortunately, it is difficult for an average user to acquire desired shitsukan in an input image by changing the individual image characteristics and selecting optimal filtering processes for the input image. When at least two image characteristics are interactively changed, it is difficult to presume the interactive result of such change, and it is even more difficult to presume the level of change in the image shitsukan before and after image processing.

PTL 1 describes an image processing apparatus that improves sensuous image quality. Multiple image characteristics are grouped in advance on the basis of the sensuous effect they provided, such as shitsukan, softness, and brightness, and are linked together so that they are interactively changed.

CITATION LIST

Patent Literature

PTL 1 Japanese Patent Laid-Open No. 10-243240

SUMMARY OF INVENTION

The shitsukan of different materials depicted in an image are not simple physical image characteristics but are deeply involved with human latent sensations, such as luster, heaviness, sharpness, and inorganicness.

Compared with an image reproducing various different image characteristics simply in an equal intensity, an image that reproduces the image characteristics in such a manner that multiple latent sensations that are triggered by the particular material are emphasized provides a more natural impression.

However, which image characteristics are to be changed by what degree to acquire an optimal result for improving the authenticity of the material depicted in the image is determined only through trials and errors and comparing the processing results. Therefore, image processing for improving the shitsukan of an image depicted in an input image is difficult even for an experienced specialist having advanced knowledge because endless attempts of trials and errors is required. This is because methods for image processing and adjustment that can be applied to a wide range of general images are not established for improving the shitsukan of materials depicted in the images.

The present invention provides an image processing apparatus that can be applied to a wide range of general images and that is capable of improving the shitsukan of materials depicted in an image by interactively adjusting multiple physical image characteristics of an image based on human latent sensations.

Solution to Problem

An image processing apparatus according to the present invention is configured to convert an input image to generate an output image having image shitsukan different from the image shitsukan of the input image by using an adjusting unit capable of individually adjusting various different physical image characteristics extracted from the input image and interactively adjusting the various different physical image characteristics. The image processing apparatus includes a first numerical converting unit configured to convert various different image-characteristic parameters quantifying the image characteristics to various different low-order-sensitivity parameters quantifying latent sensations experienced by humans when viewing an image, wherein the low-order-sensitivity parameters calculated from the output image are converted by the first numerical converting unit to approach predetermined numerical values.

Advantageous Effects of Invention

The image processing apparatus according to the present invention numerically evaluates shitsukan by converting a plurality of image characteristics to various different low-order-sensitivity parameters by a first numerical converting unit in a manner similar to humans determining shitsukan by unconsciously receiving various different latent sensations from an image.

By providing low-order-sensitivity parameters of which the relationship with the physical image characteristics is easy to understand between the physical image characteristics and the final image shitsukan, the relationship between the combinations of the image characteristics to be changed and the image shitsukan is simplified.

Since conversion is performed such that the various different low-order-sensitivity parameters approach numerical values satisfying a predetermined relationship, meaningless trial-and-error attempts that lead to unwanted changes in shitsukan are prevented. Since the change in shitsukan can be numerically grasped through the change in the low-order-sensitivity parameters, a large number of trial-and-error attempts conducted using various combinations of the image characteristics with various different levels of change do not have to be performed.

Accordingly, the image processing apparatus that can be applied to a wide range of general images and that is capable of improving the shitsukan of materials depicted in an image by interactively adjusting multiple physical image characteristics of an image based on human latent sensations.

BRIEF DESCRIPTION OF DRAWINGS

FIG. 1A illustrates the configuration of an image processing apparatus.

FIG. 1B illustrates the configuration of an image processing apparatus.

FIG. 7 illustrates a shitsukan recognition model in the third embodiment.

FIG. 15 illustrates screen display in first half of the processing in the eighth embodiment.

FIG. 16 illustrates screen display in second half of the processing in the eighth embodiment.

FIG. 18 is a flow chart illustrating image processing in the ninth embodiment.

FIG. 19A is a flow chart illustrating a method of determining image characteristics to be changed and the level of change.

FIG. 19B is a flow chart illustrating a method of determining image characteristics to be changed and the amount to be changed.

FIG. 20 illustrates screen display in the ninth embodiment.

DESCRIPTION OF EMBODIMENTS

Figure 2:
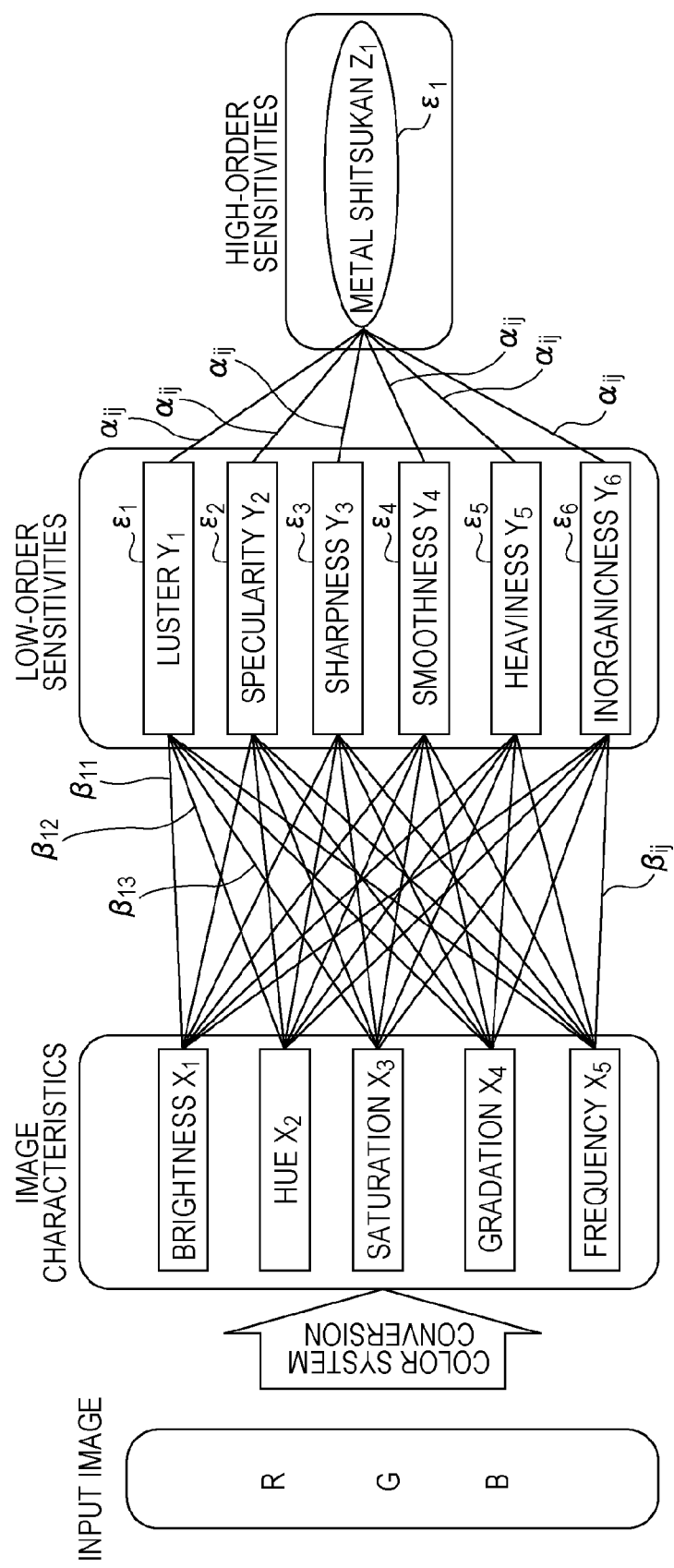
FIG. 2 illustrates a shitsukan recognition model in a first embodiment.

Embodiments of the present invention will be described below in detail with reference to the drawings. Embodiments of the present invention can be partially or entirely replaced with other configurations so long as image processing using a plurality of low-order-sensitivity parameters is performed.

In this embodiment, personal computer software for performing image processing while displaying an image on a monitor screen will be described. Instead, however, the present invention may be realized by an image pickup apparatus, such as a digital camera or a video camera, an image scanning apparatus (scanner), a television set, a mobile phone, video equipment, such as a TV game device, or an image forming apparatus, such as a color printer. In other words, the present invention can be applied to all types of equipment that process images. The present invention can be realized by a program stored in a microcomputer or a high-speed logic element provided in such an apparatus. The image display medium may be a CRT, a liquid crystal display, a plasma display, an organic EL display, a printing medium, a printed image, or a silver halide photograph.

The configuration of the image processing apparatus according to PTL 1 and general descriptions on filtering will not be repeated in the embodiments below and drawings thereof will be omitted.

Authenticity of Material Perception

Recently, high definition television (HDTV) has become popular together with HDTV broadcasting, and, as a result, image resolution, which is a main element of image quality, has increased. With cinematography, the number of projection pixels has increased such as in digital cinema systems. As a result, it has become difficult to improve image quality through improvements in physical specifications.

Thus, image quality appealing to human sensitivity has become even more important. Therefore, in addition to improving physical specifications of an apparatus by increasing the resolution, the gradation level, and the displayable number of colors, high definition image processing based on human sensitivity is realized by applying such specifications.

Such high definition image processing is realized by an image designer adjusting various image characteristics on the basis of his/her subjective view. At this time, since the image characteristics are adjusted on the basis of the designer's skills, the adjustment values vary depending on the designer. Thus, a method of adjusting image characteristics based on human sensitivity in an objective manner without depending on the designer's subjective view is in need.

When a viewer adjusts image quality, there is a problem in that it is difficult to select image characteristics to be adjusted and to recognize the change in image quality after adjusting the image characteristics. Even for a specialist in image processing, a lack in skill may lead him/her to select undesirable combinations of image characteristics for adjustment and to change the image characteristics by undesirable levels. Thus, from such a point of view, a method of image processing that allows images to be mechanically adjusted based on human sensitivity while eliminating subjective judgments by human is in need.

In light of the above-described problem, PTL 1 provides an image processing method for adjusting shitsukan in an image while eliminating the influence of skills and sensitivity unique to the image designer.

In PTL 1, physical feature values of an input image are calculated by determining the presence of a texture, analyzing the color distribution, and analyzing the presence of catchlight in the input image. Then, the classification criteria of the image are selected in accordance with an adjustment instruction from a user, and the image is classified by applying the calculated feature values. By determining the image processing operators and parameters in accordance with the classification result, image processing corresponding to the image features is possible.

However, in PTL 1, image processing corresponding to the image features is performed, but the correlation between the image features and human sensitivity is not mentioned. The combinations of the image characteristics to be adjusted and the level of change in each image characteristic are based on the subjective judgment of the designer. Thus, the adjustment may not be based on human shitsukan recognition, and shitsukan adjustment of an image based on human sensitivity may not be performed. Furthermore, general classification of an image may be possible, but it is difficult to classifying various different shitsukan in a finer manner into, for example, unique materials (e.g., metal, skin, and canvas) of an object depicted in the image. Thus, a specific type of shitsukan selected from various different types of shitsukan (hereinafter, such the specific shitsukan is referred to as "target shitsukan") cannot be adjusted.

Humans view images of materials, such as a metal glossy surface, human skin, canvas, and an ocean surface, with a certain degree of expectation, and by performing image processing to meet such expectation, the sensuous reality of an image is improved. By using an edge enhancing filter, coldness is emphasized, and by increasing redness, warmness is emphasized. Accordingly, even when the image itself is modified unnaturally, the shitsukan of the material depicted in the image appear more natural.

In this way, to provide an image appealing to human sensitivity, adjustment of the shitsukan of an objected depicted in an image should be performed based on human sensitivity. However, such processing based on human sensitivity is difficult with image processing techniques according to the related art, and processing for adjusting the shitsukan of a target material could not be performed in the past.

To solve such issues, in the embodiments below, sensitivities corresponding to shitsukan recognized by human in an image are defined on the basis of a correspondence relationship with the image characteristics of the image, and a shitsukan recognition model in which such a correspondence relationship is stored is introduced. By adjusting the shitsukan of an image using a shitsukan recognition model, shitsukan adjustment based on human sensitivity is possible.

By using a shitsukan recognition model, the target shitsukan can be adjusted using specific numerical values, and a shitsukan adjustment result appealing to human sensitivity can be achieved. Furthermore, by using a shitsukan recognition model, image quality can be improved more objectively and suitably, unlike in the past when image characteristics to be adjusted were determined on the basis of the subjective view of the designer. Finally, by performing shitsukan adjustment based on human sensitivity, image processing for acquiring high quality images appealing to human sensitivity is possible.

Image Processing Apparatus

FIGS. 1A and 1B illustrate the configuration of an image processing apparatus. As illustrated in FIG. 1A, in an image processing apparatus 100, a computer 100A executes an image processing program to convert an input image. The computer 100A interactively adjusts various different physical characteristics using an adjusting unit (111a) that is capable of individually adjusting various different physical image characteristics extracted from an input image and outputs an image having shitsukan different from that of the input image.

The computer 100A adjusts shitsukan using a shitsukan recognition model, which is described below, by displaying on a monitor screen 108 a parameter operating image 111 superimposed on an image 110 to be processed.

As illustrated in FIG. 1B, the parameter operating image 111 different levels containing image-characteristic parameters 111a, low-order-sensitivity parameters 111b, and high-order-sensitivity parameters 111c, which are linked together through calculation expressions of shitsukan recognition models, which are described below. The parameters are reference values without units and dimensions and are used to relatively evaluate various properties. By operating a mouse 106 to drag a pointer to change a parameter in any one of the levels, i.e., the image-characteristic parameters 111a, the low-order-sensitivity parameters 111b, and the high-order-sensitivity parameters 111c, the parameters in the other levels are automatically adjusted through calculation using the after-mentioned calculation equations of the shitsukan recognition models.

When a user changes one of the high-order-sensitivity parameters 111c by operating the mouse 106 to move the pointer within the parameter operating image 111 while viewing the processed image 110, calculation based on the after-mentioned calculation equation of the shitsukan recognition models is performed in accordance with the changed high-order-sensitivity parameter 111c.

Then, the calculation results are immediately reflected to the low-order-sensitivity parameters 111b and the image-characteristic parameters 111a. At the same time, image processing in accordance with the changed image-characteristic parameters 111a is performed on the original image, and the processed image 110 acquired as a result of the processing is displayed on the monitor screen 108.

The image-characteristic parameters are obtained by quantifying various different image characteristics. The low-order-sensitivity parameters are obtained by quantifying various latent sensations experience when humans view the image. The high-order-sensitivity parameters quantify the shitsukan of different materials depicted in an image.

The computer 100A converts the image characteristics so that the various different low-order-sensitivity parameters approach values satisfying a predetermined relationship. Specifically, the image characteristics are converted so that target high-order-sensitivity parameters approach predetermined values.

The image processing apparatus 100 is capable of adjusting the shitsukan of a target material depicted in an image in such a manner similar to adjustment based on human sensitivity by using the parameter operating image 111 displaying parameters linked in each level. By referring to the parameter operating image 111, high (sensitivity) image quality, which, in the past, has been achieved by the image designer subjectively selecting the image characteristics to be changed, can be achieved more objectively and adaptively. Shitsukan adjustment based on human sensitivity can be performed through minimum trial-and-error attempts, and images with detailed shitsukan appealing to human sensitivity can be acquired through image processing.

Shitsukan Recognition Model

FIG. 2 illustrates a shitsukan recognition model. As illustrated in FIG. 2, the shitsukan recognition model, which is an example of a numerical converting unit, is a modeled structure of the human shitsukan recognition process. The shitsukan recognition model is a program containing a group of equations linking parameters in the different levels of the parameter operating image 111, which is illustrated in FIG. 1B.

The shitsukan recognition model quantitatively represents the relationship among physical image characteristics (hue, saturation, brightness, gradation, and frequency), generalized latent sensations that humans perceive from an image, and shitsukan unique to a target material recognized by humans viewing an image depicting the target material. The shitsukan recognition model has three levels corresponding to the steps in the human shitsukan recognition process. In the drawing, the shitsukan recognition process proceeds from left to right.

An equation group defining the relationship between image characteristics and low-order sensitivities is equivalent to a first numerical converting unit. This equation group converts various different image-characteristic parameters, which are obtained by quantifying the image characteristics, to various different low-order-sensitivity parameters, which are obtained by quantify the latent sensations that humans perceive from the image. The various different image-characteristic parameters and the various different low-order-sensitivity parameters can be interconverted using the equation group acquired experimentally (i.e., first numerical converting unit).

Another equation group defining the relationship between low-order sensitivities and a high-order sensitivity is equivalent to a second numerical converting unit. This equation group converts various different low-order-sensitivity parameters to a high-order-sensitivity parameter quantifying various types of shitsukan different for each material depicted in the image. The various different low-order-sensitivity parameters and the high-order-sensitivity parameter can be interconverted using the equation group acquired experimentally (i.e., second numerical converting unit).

Here, an example shitsukan recognition model associated with metal shitsukan will be described. This model quantitatively represents the relationship between the physical characteristics of an image and the authenticity of metal shitsukan perceived from the image using constants uij and βij, which are multiple weighting factors determined experimentally.

The human shitsukan recognition process and the corresponding levels in the shitsukan recognition model will be described briefly. The human shitsukan recognition process starts when physical quantities of the image are visually received through the human eye. Specifically, light from the image enters the human eye and is received at the retina, where physical quantities, such as color, gradation, and resolution, are perceived by the visual cortex. This corresponds to the lower layer (image characteristics) of the shitsukan recognition model. Physical quantities representing the image characteristics include brightness, hue, saturation, gradation, and frequency.

Then, from the physical quantities perceived at the high-order visual cortex of the brain, general latent sensations, not depending on the material, are unconsciously experienced. The latent sensations are generalized sensitivities experienced in the middle of the recognition process of a material of an object. Due to the generalization, the latent sensations are experienced without recognizing the individual materials. This corresponds to the low-order sensitivities, which are in the middle level illustrated in FIG. 2.

As understood from the examples, since the low-order sensitivities are elements constituting part of the shitsukan of a material of an object, the shitsukan may be perceived while being conscious of low-order sensitivities. Low-order sensitivities latently perceived when metal shitsukan is recognized in detail include luster, heaviness, sharpness, specularity, softness, inorganicness, and color.

Finally, shitsukan (high-order sensitivity) corresponding to the material of an object depicted in the image is recognized by integrating the above-mentioned low-order sensitivities. This corresponds to the upper level in FIG. 2. Examples of high-order sensitivities include metal shitsukan, skin shitsukan, and fibrous shitsukan.

The image characteristics, the low-order sensitivities, and the high-order sensitivities are treated as numerical parameters. The parameter of the image characteristics, the low-order sensitivities, and the high-order sensitivities each include multiple feature values, and in order to recognize shitsukan (high-order sensitivity), multiple image characteristics and multiple low-order sensitivities influence each other. In the shitsukan recognition model, the feature values are set as nodes. These nodes are connected to form a network and provided with weighting factors corresponding to their levels of correlation (influence).

The image characteristics and the low-order sensitivities are converted bi-directionally using an equation group, which is the first numerical converting unit. The low-order sensitivities and the high-order sensitivity are converted bi-directionally using another equation group, which is the second numerical converting unit.

In this way, the relationship among the image characteristics, which are physical quantities, the latent sensations, and the shitsukan can be treated quantitatively using the image characteristics, low-order sensitivities, and high-order sensitivities. That is, the shitsukan of the input image can be evaluated numerically using the image-characteristic parameters (the image characteristic values), the low-order-sensitivity parameters (evaluation values of the low-order sensitivities), and the high-order-sensitivity parameter (evaluation value of the high-order sensitivity), and the shitsukan can be strengthening using the equations.

The physical quantities representing the image characteristics are not limited to combinations of due, saturation, brightness, gradation, and frequency. Depending on the type of shitsukan, modeling may be possible with a combination of a smaller number of physical quantities or a combination of a larger number of physical quantities. Less influential image characteristics may be omitted in approximation.

The various different image characteristics are defined in relation to various types of image processing for individually changing the image characteristics continuously or intermittently by image processing software, which is described below.

Image Characteristics

In a region to be processed in an input image, RGB signals from the pixels in the region are read and converted to an HSV color system or an L*C*h color system to calculate color attributes, such as brightness, hue, and saturation.

As a specific conversion method, for the HSV color system, hue (Hue), saturation (Saturation), and brightness (Value) are determined using the following conversion equations.

$$MAX = \max(R, G, B)$$

$$MIN = \min(R, G, B)$$

$$Value = MAX$$

$$Saturation = (MAX - MIN)/MAX$$

if MAX=$R$ then Hue=$(G-B)/(MAN-MIN)$ if MAX=$G$ then Hue=$2+(B-R)/(MAX-MIN)$ if MAX=$B$ then Hue=$4+(R-G)/(MAX-MIN)$ $$H = H/6 \qquad [\text{Math.1}]$$

The HSV color system is a typical color system used in computer image processing because RGB signals can be easily converted. However, by using the L*C*h color system, which uses psychological physical quantities having good human perceptual uniformity, color attributes accurately representing human sensation can be derived. The RGB signals are converted to the L*C*h color system through the following steps. First, the RGB signals of the input image are converted to CIE XYZ using a predetermined conversion equation. Specifically, the outline of conversion from sRGB signals, which comply with the RGB signal standard, to CIE XYZ is as follows.

[Math. 2]

$$\begin{pmatrix} X \\ Y \\ Z \end{pmatrix} = \begin{pmatrix} 0.4124 & 0.3575 & 0.1805 \\ 0.2126 & 0.7152 & 0.0722 \\ 0.0193 & 0.1192 & 0.9505 \end{pmatrix} \begin{pmatrix} R \\ G \\ B \end{pmatrix}$$

The XYZ values are converted to the L*C*h color system via L*, a*, and b* using the following equations.

[Math. 3]

$$L^* = 116\left(\frac{Y}{Yn}\right)^{1/3} - 16$$

$$a^* = 500\left[\left(\frac{X}{Xn}\right)^{1/3} - \left(\frac{Y}{Yn}\right)^{1/3}\right]$$

$$b^* = 200\left[\left(\frac{X}{Xn}\right)^{1/3} - \left(\frac{Z}{Zn}\right)^{1/3}\right]$$

$$C^* = \sqrt{(a^*)^2 + (b^*)^2}$$

$$h = \tan^{-1}(b^*/a^*)$$

Next, a method of calculating the gradation characteristics will be described. The gradation characteristics can be determined by calculating a brightness histogram using brightness L*, which is one of the above-mentioned physical quantities. To acquire a frequency distribution in human perception of uniform light, it is desirable to use histogram of L* signals in the L*C*h color system.

Next, a method of calculating the frequency characteristics will be described. The frequency characteristics are determined by performing Fourier transformation on an image. Two-dimensional frequency characteristics may be used. Instead, for simplicity, frequency characteristics with directionality or frequency characteristics similar in all directions may be used. To acquire frequency characteristics similar to human perception, it is desirable to perform Fourier transformation on the image signal converted to L* signals in the L*C*h color system, and to multiply the results by a visual transduction factor (VTF) in consideration of the space frequency characteristics of visual sense.

Various researches have been conducted in association with the VTF used here. For example, the features illustrated in FIG. 5.4 in Chapter 5 of "Handbook of Visual Information Processing, (nihon shikaku gakkai hen)," 2000, Asakura Shoten, may be referred to.

In this embodiment, as described above, an L*C*h color system is used. However, image processing may be performed using a color system other than the L*C*h color system. It is also possible to use an HSV color system, and it is possible to directly form a shitsukan model using the RGB gradation values.

The gradation characteristics may simply be a histogram of G signals. The RGB gradation values may be converted to signals such as YUV signals comply with the NTSC standard, and a luminance histogram associated with a luminance component Y, which is a physical quantity, may be used.

Method of Determining Weighting Factor

As illustrated in FIG. 2, in the first embodiment, to form a model of the human shitsukan recognition structure, an interview survey using an evaluation grid method was conducted, and an evaluation structure for recognizing shitsukan was constructed. The evaluation structure is an objective structure based on the causal relationships of the evaluation items and is a network structure in which related evaluation items are linked together. The evaluation items are extracted as terms integrating or including similar words obtained through the interview survey. By extracting higher and lower concepts, a hierarchical structure is obtained.

After constructing the evaluation structure, the strengths of the causal relationship among the evaluation items are determined. To do this, a questionnaire survey using a rating scale method was conducted, and covariance structure analysis or multiple regression analysis was performed using the results of the questionnaire survey and the evaluation structure to calculate the weighting factors for the evaluation items.

Next, a method of obtaining a weighting factor for a shitsukan recognition model illustrated in FIG. 2 will be described in detail. A method of constructing a shitsukan recognition model includes a first step of preparation, a second step of experiment, and a third step of statistical processing.

In the first step, image processing is performed on an original image depicting a material having target shitsukan to change the physical image characteristics, and evaluation images having of image characteristics individually or interactively changed in gradation are prepared. In the first step, evaluation images to be displayed on a display on which the final output image is displayed are prepared. Multiple evaluation images are prepared by individually changing the image-characteristic parameters 111a, which are illustrated in FIG. 1B, in gradation.

Specifically, three original images capturing a glossy metal surface are provided to construct a shitsukan recognition model for metal shitsukan. Image processing in which five image characteristics (brightness, hue, saturation, frequency, and gradation) in the three original images are interactively changed in gradation on the basis of an experimental design method to prepare multiple evaluation images. For brightness, hue, and saturation, values after adjustment can be acquired by directly changing the values using software. For the gradation characteristics, the values are changed by performing, for example, tone curve processing. For frequency, the values can be changed by performing, for example, edge enhancement or smoothing. In this way, various filtering functions of software can be used.

In the second step, subjects visually compare the multiple evaluation images to evaluate the level of sensuous change in various different latent sensations and the level of sensuous change in the shitsukan of the material depicted in the image, and the degree of contribution of the various different latent sensations to the shitsukan is measured.

The second step is carried out on multiple subjects using the evaluation images displayed on a display medium on which a final output image is displayed. By carrying out the second step in the same way on the multiple subjects, the degree of contribution of various different latent sensations to one type of shitsukan is sampled without bias to a particular subject. A questionnaire survey is conducted on subjects so as to perform relative evaluation, by humans, of low-order sensitivities and a high-order sensitivity for the individual evaluation images linked to the image-characteristic parameters 111a, which are illustrated in FIG. 1B.

Specifically, the original images and one evaluation image are displayed side-by-side on a liquid crystal display, and six latent sensations and one type of shitsukan are evaluated on a five-point scale. The evaluation items for latent sensations are heaviness, clearness, inorganicness, luster, smoothness, and specularity, and the evaluation item for shitsukan is metal shitsukan. For each evaluation item, the presence of a latent sensation defined by selected from a five-point scale: "present," "slightly present," "neutral," "almost not present," and "not present."

In the third step, the measurement results obtained in the second step are statistically processed, and conversion equations for the low-order-sensitivity parameters and the image-characteristic parameters, which quantify the various different latent sensations, are derived. Weighting factors required for calculating the low-order-sensitivity parameters associated with a target material are determined. In the third step, the measurement results acquired in the second step are statistically processed, and conversion equations for the high-order sensitivities and the low-order sensitivities, which quantify the shitsukan of various different materials, are derived. A weighting factor required for calculating the high-order-sensitivity parameters associated with a target material is determined.

The high-order-sensitivity parameters $111c$ and the low-order-sensitivity parameters $111b$, which are acquired through the questionnaire survey, are assigned to the evaluation images such that they correspond to the image-characteristic parameters $111a$, which are illustrated in FIG. 1B. Through statistical processing, weighting factors to be used in conversion between parameters in each level are specifically determined, and the specific weighting factors are linked to the parameters in each level illustrated in FIG. 1B through an equation group to which the weighting factors are applied.

In the first embodiment, since the shitsukan recognition model is constructed through an interview survey and a questionnaire survey conducted on multiple image-processing/image-evaluation related workers, highly precise image adjustment that does not depend on the subjective view of one image designer can be performed.

In this way, a shitsukan recognition model is constructed solely on the basis of objectively judging the evaluation images with hidden image characteristics, without subjectively determining whether the image characteristics should be changed. Therefore, the degree of contribution of each image characteristic to the metal shitsukan is determined accurately.

In any case, meaningless trial-and-error attempts for image processing by the user can be avoided by providing, as software, the results of trials and errors performed using evaluation images in the questionnaire survey as specific numerical conversion equations of shitsukan recognition models. Since the effect of the image processing is entirely reflected in the software, even inexperienced users can directly and easily select the type of image processing and the amount of processing desirable for the image processing.

Since a shitsukan recognition model is constructed by performing an interview survey and a questionnaire survey to many viewers, image adjustment based on the sensitivity of an average viewer is possible.

Since the type of shitsukan differs for each material of an object, a shitsukan recognition model should be constructed for each type of shitsukan of a material. Since the causal relationship changes as visual characteristics change due to aging, the weighting factors changes, too. Therefore, depending on the use, a second questionnaire survey may have to be conducted on different age groups.

Reference of the evaluation grid method includes "Phenomenological Approach to the Evaluation of Places: A Study on the Construct System Associated with Place Evaluation, Junichiro Sunai et. al, Journal of Architecture, Planning and Environmental Engineering, (1986), Vol. 367, pp. 15-21, Architectural Institute of Japan.

In addition to the evaluation grid method, an evaluation structure may be constructed by conducting a questionnaire survey using an SD method and carrying out factor analysis on the result to extract factors associated with shitsukan.

Reference of covariance structure analysis includes "Introduction to Structural Equation Modeling: Covariance Structure Analysis, Hideki Toyoda, 1998, Chapter 6, section 1 and section 2, Asakura Shoten.

First Embodiment

Figure 3:
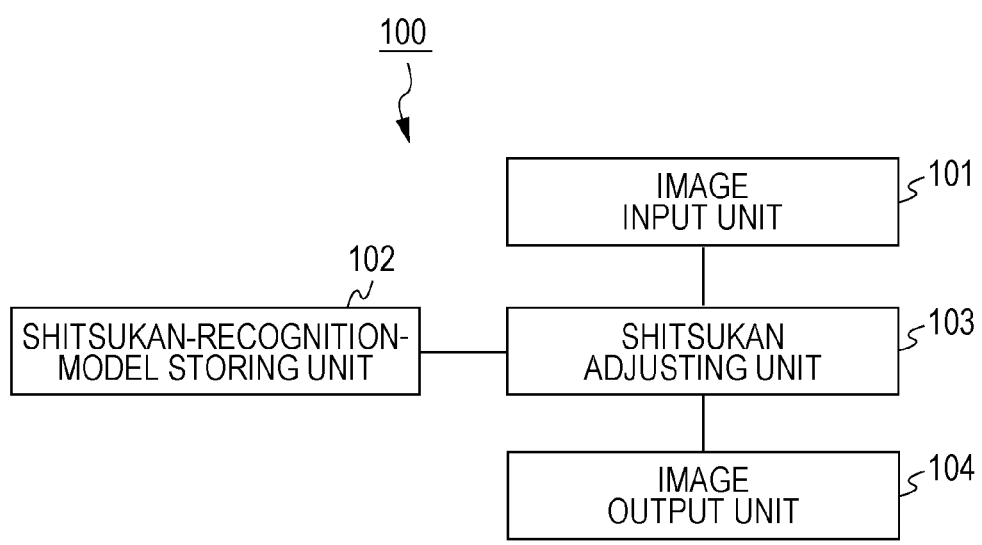
FIG. 3 illustrates the configuration of an image processing apparatus according to the first embodiment.
Figure 4A:
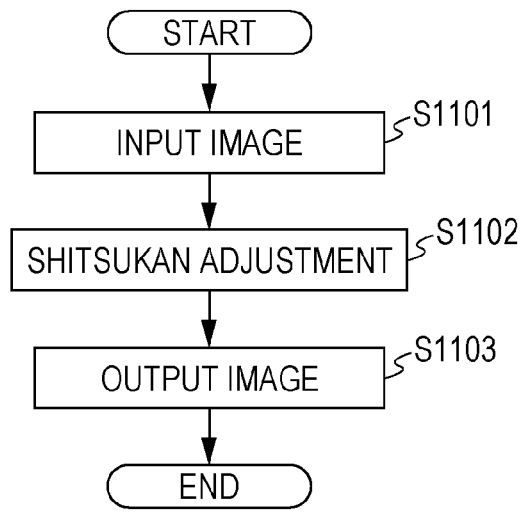
FIG. 4A is a flow chart illustrating image processing control in the first embodiment.
Figure 4B:
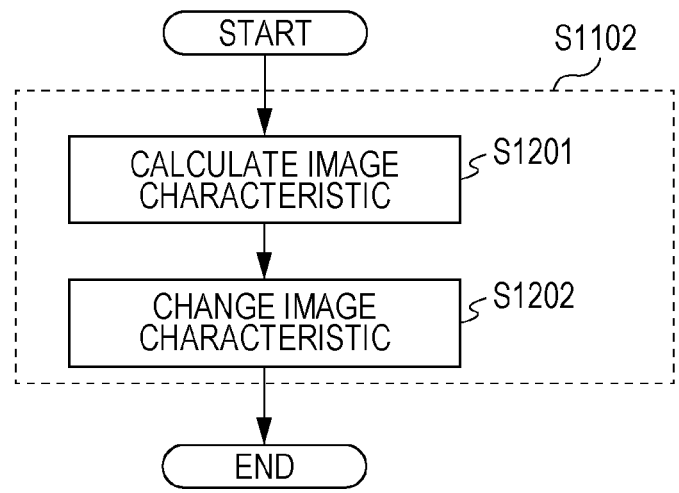
FIG. 4B is a flow chart illustrating image processing control in the first embodiment.
Figure 4C:
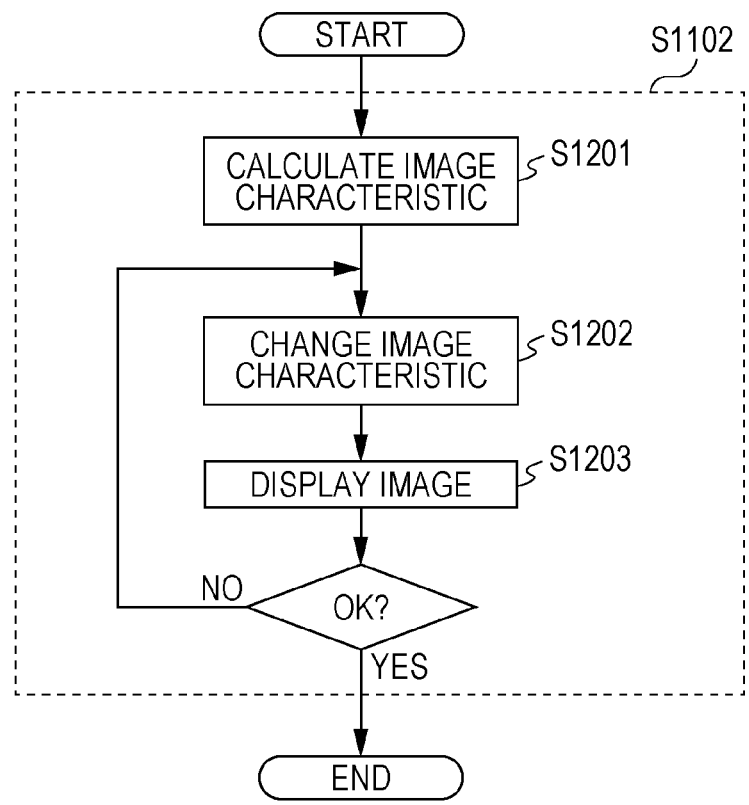
FIG. 4C is a flow chart illustrating image processing control in the first embodiment.

FIG. 3 illustrates the configuration of an image processing apparatus according to a first embodiment. FIGS. 4A, 4B, and 4C are flow charts illustrating image processing control in the first embodiment.

As illustrated in FIG. 3, an input image to be shitsukan-adjusted is input to an image input unit 101 of an image processing apparatus 100. When an image is merely input, the shitsukan is to be adjusted is unclear. Even when a region is assigned for shitsukan adjustment, the shitsukan of the assigned region is unclear. The image input unit 101 includes an input device for assigning shitsukan of a material depicted in the image that is to be adjusted and assigning adjustment values which correspond to the amount of adjustment. Shitsukan adjustment may be performed on the entire image or may be performed on part of the image depicting a specific object assigned as a shitsukan adjusting region.

Shitsukan recognition models, which are modeled structures used for human shitsukan recognition, are stored in a texture-recognition-model storing unit 102. The shitsukan recognition models stored in the shitsukan-recognition-model storing unit 102 has been described with reference to FIG. 2.

A shitsukan-adjustment unit 103 calls up a shitsukan recognition model for a target material from the shitsukan-recognition-model storing unit 102 and performs shitsukan adjustment for strengthening the shitsukan of a material depicted in an image.

An image output unit 104 outputs the shitsukan-adjusted image to a display device or stores the image to a storage medium.

As illustrated in FIG. 4A with reference to FIG. 3, first, an input image of which the target shitsukan is to be adjusted is input to the image input unit 101 (S1101).

Information about the input image and the type of shitsukan to be adjusted is input to the shitsukan-adjustment unit 103, and shitsukan is adjusted in accordance with the steps in the flow chart illustrated in FIG. 4B (S1102).

As illustrated in FIG. 4B, first, the image characteristic values of the input image are calculated (S1201). As described above, the image characteristics values include brightness, hue, saturation, gradation, and frequency. Based on the information about the type of the assigned shitsukan, the shitsukan-adjustment unit 103 acquires a corresponding shitsukan recognition model and converts the image characteristics in accordance with the adjustment values of the assigned shitsukan (S1202).

The shitsukan adjustment values may be assigned when the image is input, as described above, or may be a fixed value for each type of shitsukan to be adjusted. To assign the shitsukan adjustment values when the image is input, a user interface screen displayed on a monitor screen or an operating unit attached to the image input unit 101 may be used.

A method of changing the image characteristics in accordance with the shitsukan adjustment values will be described below. To change the image characteristics, first, the image characteristic values after shitsukan adjustment must be calculated. An image characteristic value is calculated by following a link from a high-order sensitivity to a low-order sensitivity and then to an image characteristic by changing the value of the high-order sensitivity, which is in a higher level in the shitsukan recognition model illustrated on the right side in FIG. 2. The calculation from a high-order sensitivity to a low-order sensitivity is performed using the following equation.

[Math.4]

$$Y_i \alpha_{ij}(Z_j - \epsilon_j) \quad \text{Equation 1}$$

Here, the factor $\alpha_{ij}$ is a weighting factor representing the correlation between a high-order sensitivity and a low-order sensitivity, and the factor $\epsilon_j$ represents an error in a high-order sensitivity value, including individual differences occurring during construction of the shitsukan recognition model. Here, i represents an evaluation item number of the low-order sensitivity, and j represents an evaluation item number of the high-order sensitivity. $Z_j$ represents a high-order sensitivity value after adjusted with a shitsukan adjustment value, and $Y_i$ represents a low-order sensitivity value corresponding to the shitsukan adjustment value. That is, a low-order sensitivity value $Y_i$ is determined by subtracting an error $\epsilon_j$ from a high-order sensitivity value $Z_j$ after shitsukan adjustment and multiplying the corresponding correlation factor $\alpha_{ij}$. That is, weighting factors $\alpha 11$, $\alpha 21$, $\alpha 31$, $\alpha 41$, $\alpha 51$, $\alpha 61$ and a factor $\epsilon 1$ are read from a memory; a target high-order sensitivity value $Z1$ is set; and low-order sensitivity values $Y1$, $Y2$, $Y3$, $Y4$, $Y5$, and $Y6$ are calculated.

After the low-order sensitivity value is calculated from the high-order sensitivity value, an image characteristic value, which is in the next level, is calculated. The image characteristic value is calculated from a low-order sensitivity value using the following equation.

[Math. 5]

$$X_i = \sum_{j=1}^{n} \beta_{ij}(Y_j - \varepsilon_j) \quad \text{Equation 2}$$

Here, the factor $\beta_{ij}$ is a weighting factor representing the correlation between a low-order sensitivity value and an image characteristic value, and the factor $\epsilon_j$ represents an error in a low-order sensitivity value, including individual differences occurring during construction of the shitsukan recognition model. Here, i represents an evaluation item number of a low-order sensitivity value, and j represents an evaluation item number of a high-order sensitivity value.

$Y_j$ represents a low-order sensitivity value corresponding to a shitsukan adjustment value, and $X_i$ represents an image characteristic value taking into consideration all low-order sensitivity values corresponding to the shitsukan adjustment value.

That is, an image characteristic values $Z_i$ is determined by subtracting an error $\epsilon_j$ from a low-order sensitivity value $Y_j$ after shitsukan adjustment and multiplying the corresponding correlation factor $\beta_{ij}$. $X_i$ represents an image characteristic adjustment value corresponding to a shitsukan adjustment value. Through such calculation, the image characteristic values after shitsukan adjustment are calculated.

At this time, image characteristic values corresponding to a gradation of shitsukan adjustment values may be stored in a look-up table (LUT) in advance, and an image characteristic value corresponding to a shitsukan adjustment value may be selected.

Once the image characteristic values are calculated, the shitsukan-adjustment unit 103 performs image processing so that the image characteristic values of the image approach the calculated image characteristic values (S1202). Brightness, hue, and saturation can be directly changed to set them to the image characteristic values after shitsukan adjustment. For gradation, the values are changed by performing, for example, tone curve processing. For frequency, the values are changed by performing, for example, edge enhancement or smoothing.

The processing for changing the image characteristics is not limited to that described above so long as the image characteristic values are changed to image characteristic values after shitsukan adjustment.

After shitsukan adjustment (S1102) is completed, the image output unit 104 outputs the shitsukan-adjusted image to the display device, the image output device, and the storage medium (S1103).

As described above, by using a shitsukan recognition model illustrated in FIGS. 1A and 1B, shitsukan adjustment based on human sensitivity is possible. Furthermore, image representation appealing to human sensitivity is possible through shitsukan adjustment.

In the first embodiment, a static image is described. However, similar shitsukan adjustment may also be performed on a video image. The image described in the first embodiment includes not only static images but also moving images. The image input unit 101 holds image processing programs for various types of image and video. An image pickup device, a display device, an image output device, etc. installed in the image processing apparatus according to the first embodiment are capable of acquiring shitsukan-adjusted images. Thus, the present invention can be applied to a wide-range of apparatuses.

Second Embodiment

FIG. 4C illustrates shitsukan adjustment of a second embodiment. The image processing of the second embodiment is the same as that of the first embodiment, except that the flow chart in FIG. 4B is replaced with the flow chart in FIG. 4C.

As illustrated in FIG. 4C with reference to FIGS. 1A and 1B, in the second embodiment, shitsukan adjustment using a shitsukan recognition model illustrated in FIG. 2 is performed while displaying an input image on the monitor screen 108. First, the parameter operating image 111 is superimposed on the input image. After shitsukan adjustment (S1202), the processed image 110, which is the processing result, and the parameter operating image 111 are displayed on the monitor screen 108 (S1203). While viewing the result, the user can change the shitsukan adjustment values on the parameter operating image 111.

Shitsukan adjustment is performed again on the basis of the changed adjustment values, and, immediately after, the processed image 110, which is the processing result, and the parameters in the different levels extracted from the processed image 110 are displayed in the parameter operating image 111 (S1203). After the user views and accepts the result (YES in S1204), shitsukan adjustment (S1102) is completed.

Third Embodiment

Figure 5:
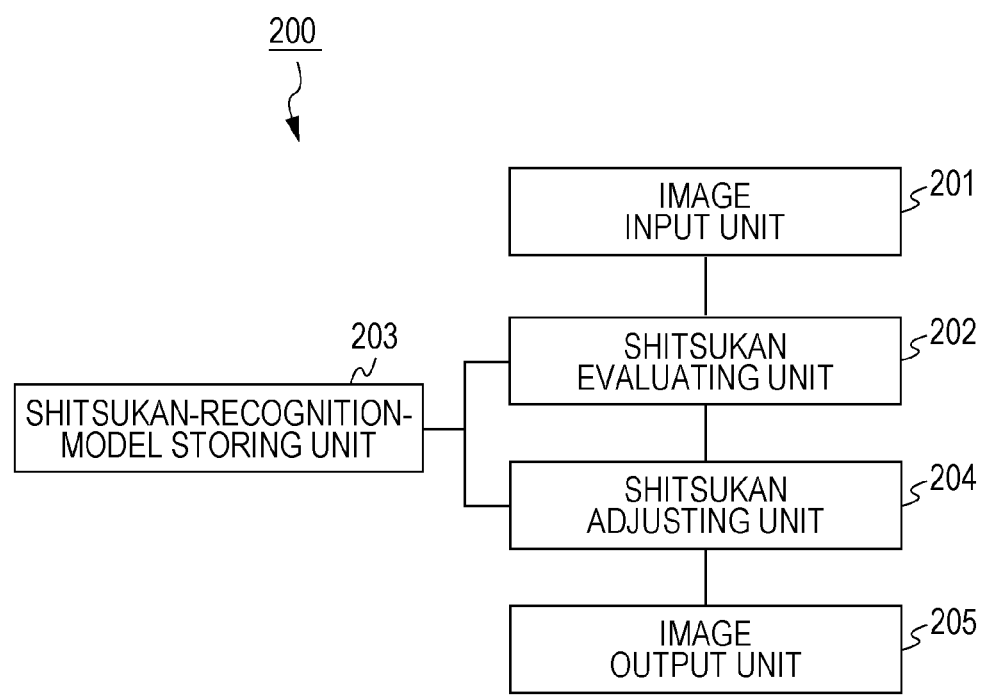
FIG. 5 illustrates the configuration of an image processing apparatus according to a third embodiment.
Figure 6A:
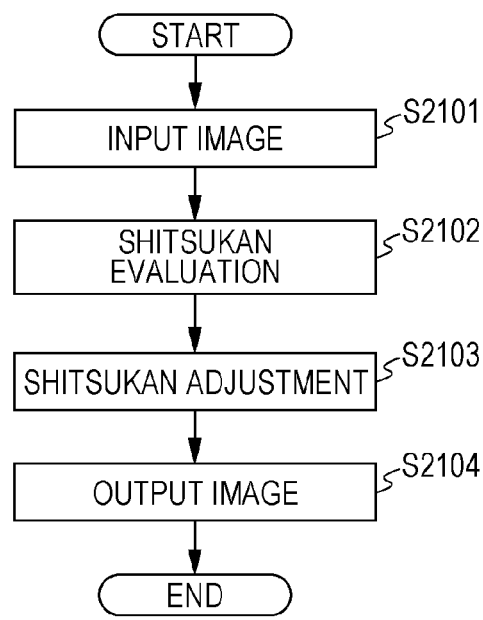
FIG. 6A is a flow chart illustrating image processing control in the third embodiment.
Figure 6B:
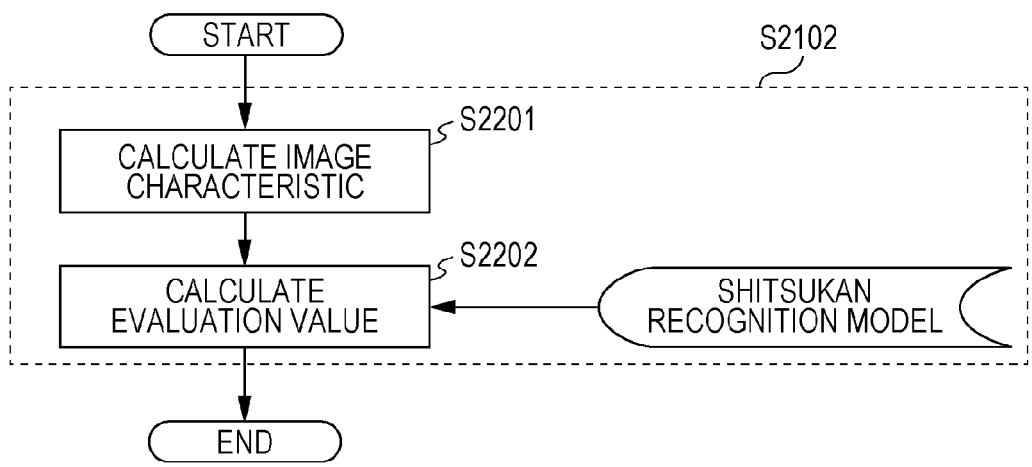
FIG. 6B is a flow chart illustrating image processing control in the third embodiment.
Figure 8:
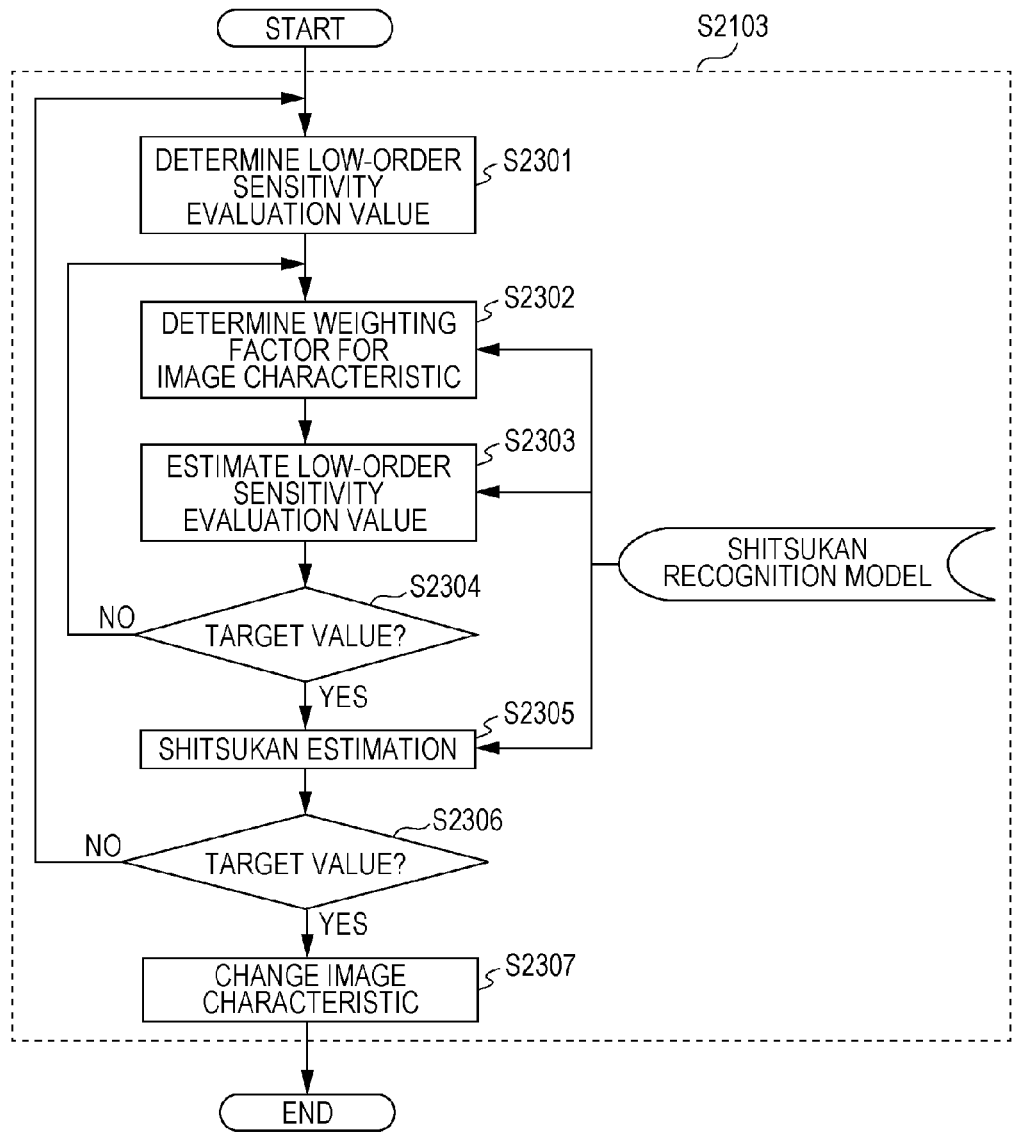
FIG. 8 is a flow chart illustrating image processing control in the third embodiment.

FIG. 5 illustrates the configuration of an image processing apparatus according to a third embodiment. FIGS. 6A and 6B are flow charts of image processing control of the third embodiment. FIG. 7 illustrates a shitsukan recognition model of the third embodiment.
FIG. 8 is a flow chart illustrating shitsukan adjustment of the third embodiment.

As illustrated in FIG. 5, an image processing apparatus 200 according to the third embodiment has substantially the same configuration as that illustrated in FIG. 2 according to the first embodiment, except that a shitsukan evaluating unit 202 is added.

As illustrated in FIGS. 6A and 6B with reference to FIG. 5, similar to the first embodiment, the image processing unit 101 of the image processing apparatus 200 receives an input image, an assignment of a material of which the shitsukan is to be adjusted, and shitsukan adjustment values (S2101). Similar to the first embodiment, a shitsukan recognition model of a modeled structure used for human shitsukan recognition is stored in the shitsukan-recognition-model storing unit 102.

The shitsukan evaluating unit 202 performs shitsukan evaluation of the input image (S2102). Shitsukan evaluation (S2102) of the input image is performed as illustrated in FIG. 6B. Similar to the first embodiment, first, image characteristics of the input image are determined (S2201).

Next, shitsukan evaluation values are calculated using the image characteristic values and the shitsukan recognition model stored in a shitsukan-recognition-model storing unit 203 (S2202).

As illustrated in FIG. 7, in the shitsukan recognition model, the evaluation values at nodes are calculated by following links from image characteristics on the left side toward the right to low-order sensitivities and then to a high-order sensitivity.

[Math. 6]

$$Y_i = \sum_{j=1}^{n} \alpha_{ij} X_j + \varepsilon_i \qquad \text{Equation 3}$$

Here, the factor $\alpha_{ij}$ is a weighting factor representing the correlation between experimentally determined evaluation items, and the factor $\varepsilon_i$ represents an error in an evaluation item, including individual differences occurring when the shitsukan recognition model is experimentally constructed. Here, i represents an evaluation item number of an evaluation item in a target level, and j represents an evaluation item number of an evaluation item in a level one level lower than the target level.

$X_j$ represents the evaluation value of an evaluation item in the level one level lower than the target level, and $Y_i$ represents the evaluation value of an evaluation item in the target level. For example, when the low-order sensitivities are in the target level, $X_j$ corresponds to an image characteristic value in the level illustrated on the left in FIG. 7, and $Y_i$ represents the evaluation value of a low-order sensitivity. Similarly, when a high-order sensitivity is in the target level, $X_j$ represents the evaluation value the evaluation value of a low-order sensitivity, and $Y_i$ represents the evaluation value of shitsukan, which is a high-order sensitivity.

Accordingly, the evaluation values of the low-order sensitivities are calculated using the image characteristic values, which are physical quantities, and finally, the evaluation value of metal shitsukan, which is a high-order sensitivity, is obtained using the evaluation values of the low-order sensitivities.

The shitsukan evaluating unit 202 calculates the evaluation value of the metal shitsukan (S2202), and the shitsukan evaluation (S2102) is completed. A shitsukan adjusting unit 204 calls up a shitsukan recognition model from the shitsukan-recognition-model storing unit 203 and performs shitsukan adjustment for strengthening the shitsukan (S2103). The shitsukan adjusting unit 204 selects the image characteristics to be adjusted one the basis of the evaluation value of the high-order sensitivity (metal shitsukan) and the evaluation values of the low-order sensitivities calculated in the shitsukan evaluation (S2102). The shitsukan adjusting unit 204 determines whether the metal shitsukan is strong or weak on the basis of the evaluation value of the metal shitsukan. When the metal shitsukan is weak, processing for increasing the metal shitsukan is performed, whereas, when the metal shitsukan is too strong, processing for weakening the metal shitsukan is performed (S2103).

After it is determined how the metal shitsukan is to be adjusted, the shitsukan adjusting unit 204 determines how much the image characteristic values are to be changed. At this time, since an image characteristic value influences the evaluation values of other low-order sensitivities, the image characteristic value to be changed and the amount of change thereof are determined while referring to the evaluation values of the other low-order sensitivities. After the level of change in the image characteristics is determined, the shitsukan adjusting unit 204 performs image processing accordingly.

As illustrated in FIG. 8 with reference to FIG. 5, the shitsukan adjusting unit 204 carries out a method of determining the image characteristics to be changed and a method of determining the level of change. First, the lowest value among the evaluation values of the low-order sensitivities influencing the evaluation value of the metal shitsukan is determined (S2301). Next, among all image characteristics, the image characteristic having the greatest influence on the selected low-order sensitivity is determined from the weighting factors (S2302).

Subsequently, the evaluation value of the low-order sensitivity recalculated for when the selected image characteristic is adjusted is calculated (S2303). Whether the evaluation value of the low-order sensitivity reaches a target value is determined, and when the target value is not reached, the adjustment value is changed so that the target value is reached (S2304).

Since a large change in the image characteristic may cause the image to generate an unpleasant sensation, a maximum value for adjustment is set, and adjustment larger than this value is not performed. Therefore, there is a possibility that the low-order sensitivity might not reach the target value even when it is in an adjustable range. In such a case, the image characteristic having the second greatest influence on the selected low-order sensitivity is selected and changed (S2302).

When the target value is reached (YES in S2304), the evaluation value of the metal shitsukan is recalculated for when the selected low-order sensitivity is adjusted (S2305). Then, whether the evaluation value of the metal shitsukan reaches the target value is determined (S2306).

When the target value is not reached (NO in S2306), the low-order sensitivity having the second greatest influence is selected (S2301), and the image characteristic for the low-order sensitivity having the second greatest influence is adjusted (S2302 to S2306).

In contrast, when the evaluation value of the high-order sensitivity reaches a target value (YES in S2306), image processing similar to that of the first embodiment is performed so that the levels of change in the image characteristics to be changed are satisfied at this point in the process (S2307). In this way, shitsukan adjustment for strengthening the shitsukan (S2103) is completed.

Upon completion of shitsukan adjustment for strengthening the shitsukan (S2103), an image is output in the same manner as in the first embodiment (S2104 in FIG. 6A). An image output unit 205 outputs the shitsukan-adjusted image to a display device or to a storage medium for storage (S2104).

In the third embodiment, by adding shitsukan evaluation (S2102), the user does not have to input the amount of shitsukan adjustment, and optimal shitsukan adjustment can be performed automatically based on the shitsukan recognition model (FIG. 7).

By performing shitsukan evaluation, instead of adjusting all low-order sensitivities, it is possible to adjust the low-order sensitivities that are weak in the original image, and, thus, shitsukan adjustment based on human sensitivity can be performed.

Here, evaluation values are determined through calculation. However, to calculate the evaluation values at high speed, various evaluation values (Equation 3) may be calculated for various different values in advance and saved in a look-up table (LUT).

Fourth Embodiment

In the third embodiment, the process of strengthening the metal shitsukan is described. To weaken the metal shitsukan, the adjustment value of the high-order sensitivity may be set in accordance with the flow chart in FIG. 8.

The metal shitsukan is to be weakened when the image generates an unpleasant sensation such as when the evaluation value of the metal shitsukan are too large and/or when the metal part depicted in the image is too glossy.

In such cases, it is determined whether the evaluation values of the low-order sensitivities influencing the evaluation value of the metal shitsukan exceed a maximum adjustable value. When a low-order sensitivity exceeds an adjustable range, to prevent this, an image characteristic having the greatest influence on the low-order sensitivity may be suppressed.

In addition to the above-described method, adjustment may be performed by selecting an image characteristic having the greatest influence on the metal shitsukan.

In the third and fourth embodiments, examples of a method of selecting an image characteristic and a method of setting the level of change are described. However, these methods are not limited thereto. In either case, so long as an image characteristic is selected and changed so that a desired shitsukan can be adjusted by using a shitsukan recognition model, any method may be employed.

Fifth Embodiment

Figure 9:
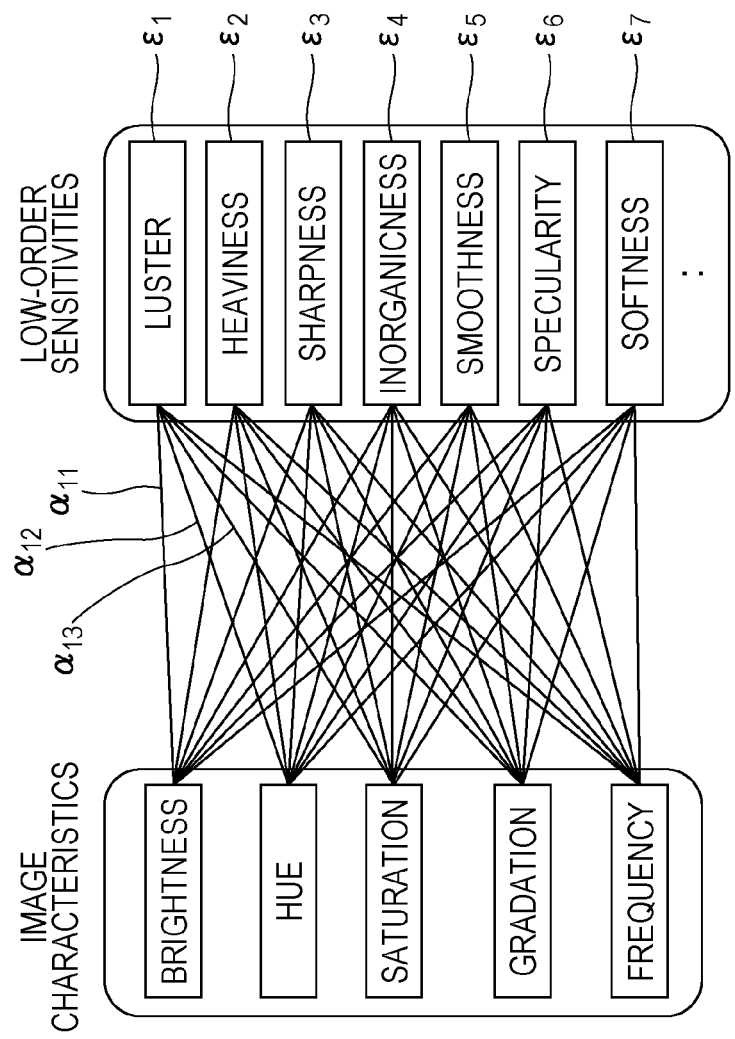
FIG. 9 illustrates a shitsukan recognition model in a fifth embodiment.

FIG. 9 illustrates a shitsukan recognition model of a fifth embodiment.

Figure 10:
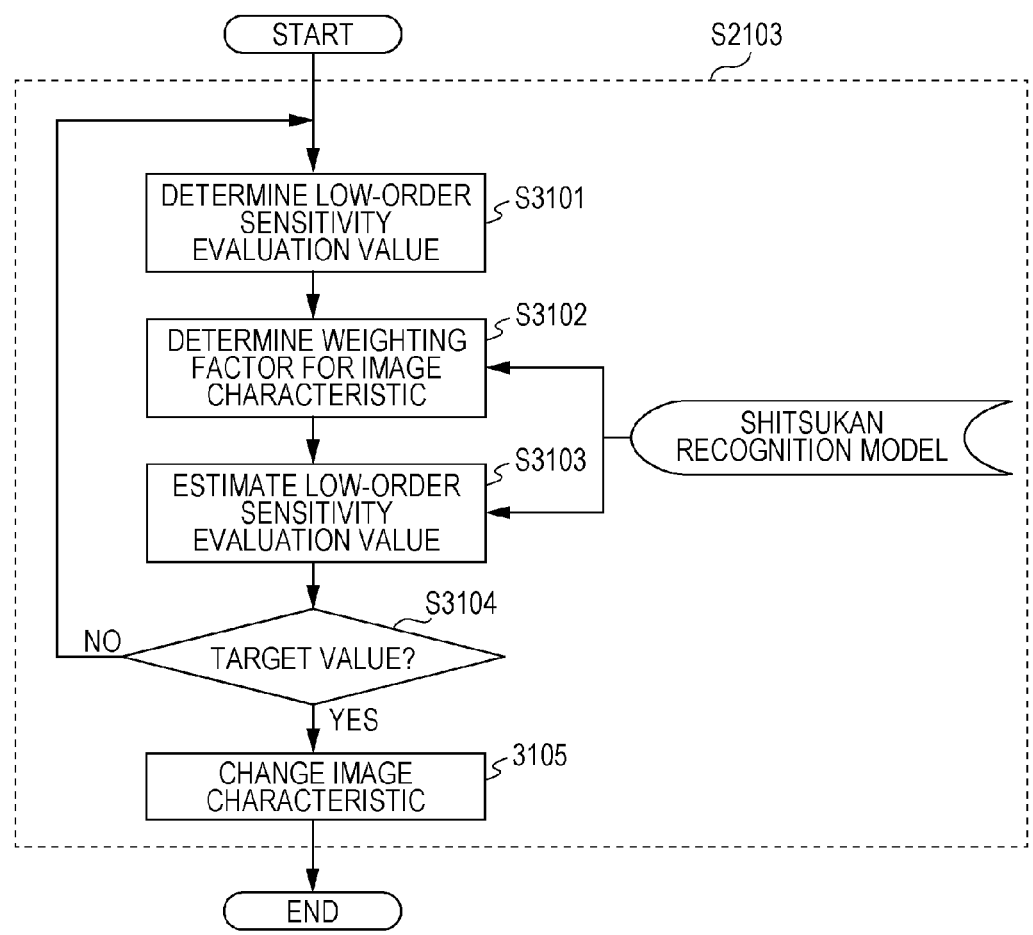
FIG. 10 is a flow chart illustrating shitsukan adjustment in the fifth embodiment.

FIG. 10 is a flow chart illustrating shitsukan adjustment of the fifth embodiment. The configuration of an image processing apparatus according to the fifth embodiment is the same as that according to the third embodiment, except that shitsukan adjustment is performed using part of the shitsukan recognition model.

As illustrated in FIG. 9, the part of the shitsukan recognition model used is an evaluation structure part of low-order sensitivities and image characteristics, excluding high-order sensitivities in the higher level. Since the low-order sensitivities are latently recognized when shitsukan, which is a high-order sensitivity, is recognized, when an image is viewed with emphasis on low-order sensitivities, the low-order sensitivities can be considered as part of the shitsukan. Accordingly, by adjusting the low-order sensitivities, instead of the high-order sensitivity, the impression of the entire image can be adjusted.

When shitsukan recognition models are constructed for various different types of shitsukan, the evaluation items of low-order sensitivities, which are latently perceived when shitsukan is recognized, more or less prescribed. As illustrated in FIG. 9, some typical items are luster, heaviness, sharpness, inorganicness, smoothness, specularity, and softness.

The correlation between the low-order sensitivities and the image characteristics is generalized to an average value by increasing the types of shitsukan. In this way, shitsukan recognition models do not need to be stored for every type of shitsukan, and these shitsukan recognition models can be substituted by one shitsukan recognition model excluding the high-order sensitivities.

The flow chart in FIGS. 6A and 6B illustrates the processing performed by the image processing apparatus according to the fifth embodiment applied to the configuration according to the third embodiment illustrated in FIG. 5.

As illustrated in FIGS. 6A and 6B with reference to FIG. 5, first, an image of which the shitsukan is to be adjusted is input to the image input unit 201 (S2101). Similar to the second embodiment, the shitsukan evaluating unit 202 determines the image characteristics of the input image and calculates the evaluation values with Equation 1 using the image characteristic values and a shitsukan recognition model (S2102). Here, the evaluation values are evaluation values of the low-order sensitivities; the evaluation value of the high-order sensitivity does not have to be calculated.

The shitsukan adjusting unit 204 uses the evaluation values of the low-order sensitivities calculated at the shitsukan evaluating unit 202 and performs shitsukan adjustment by changing the image characteristics (S2103). In this case, shitsukan adjustment is equivalent to adjustment of the low-order sensitivities.

In the fifth embodiment, shitsukan adjustment (S2103) is performed in accordance with the flow chart illustrated in FIG. 10.

As illustrated in FIG. 10 with reference to FIG. 5, first, the evaluation values of the low-order sensitivities are determined, and a low-order sensitivity to be adjusted is selected (S3101).

To supplement a lacking type of shitsukan, a low-order sensitivity having the smallest evaluation value may be selected. However, it may also be possible to select a low-order sensitivity having the largest evaluation value so as to strengthen the feature shitsukan in the image. Furthermore, whether the selected low-order sensitivity is to be strengthened or weakened should be determined on the basis of the evaluation values of other low-order sensitivities (S3101).

In addition to automatic adjustment of the shitsukan by evaluation values, the configuration illustrated in FIG. 4A may be employed, and the user carrying out the shitsukan adjustment may select the low-order sensitivities to be adjusted via an interface. Simultaneously, the adjustment value for strengthening or weakening the assigned low-order sensitivity may be instructed via the interface.

Next, to adjust the selected low-order sensitivity with a certain directionality, the image characteristic to be adjusted is determined by a weighting factor of the shitsukan recognition model, and, at the same time, the level of change in the image characteristic is determined (S3102). Then, the evaluation value of the low-order sensitivity for when the determined image characteristic is changed by the determined level of change is estimated (S3103).

Next, it is determined whether the evaluation value of the low-order sensitivity estimated in Step S3103 reaches a target value (S3104). When the evaluation value does not reach the target value, the process returns to Step S3102 and is repeated until the evaluation value reaches the target value. At this time, when the target value is not reached by changing one image characteristic (NO in S3104), another image characteristic is changed. Since other low-order sensitivities also change by changing the image characteristics, it is desirable to change a plurality of image characteristics by small amounts so that the influence on other low-order sensitivities is minimized.

When the target value is reached (YES in S3104), the image characteristics are changed in accordance with the result in Step S3104 (S3105).

As illustrated in FIG. 6A with reference to FIG. 5, upon completion of shitsukan adjustment for strengthening the shitsukan (S2103), an image is output in the same manner as in the third embodiment (S2104). The image output unit 205 outputs the shitsukan-adjusted image to a display device or to a storage medium for storage (S2104).

As described above, in the image processing of the fifth embodiment, since the shitsukan is not adjusted for each material, even when there is a plurality of materials in an image, a target region does not have to be assigned. Thus, the impression of the entire image can be adjusted through latent sensation, not depending on the material. Furthermore, even when a shitsukan recognition model corresponding to a material of an object in the image is not available, the shitsukan can be adjusted through low-order sensitivities, and a more general use is possible. Thus, generalized shitsukan adjustment become possible without storing a plurality of shitsukan recognition models corresponding to various types of shitsukan, which are high-order sensitivities.

As described above, image mode switching of an image display device and an image favored by the user can be displayed. At this time, since image adjustment is possible through evaluation items, which are low-order sensitivities, image adjustment easily noticeable by an average user can be achieved.

Sixth Embodiment

Figure 11:
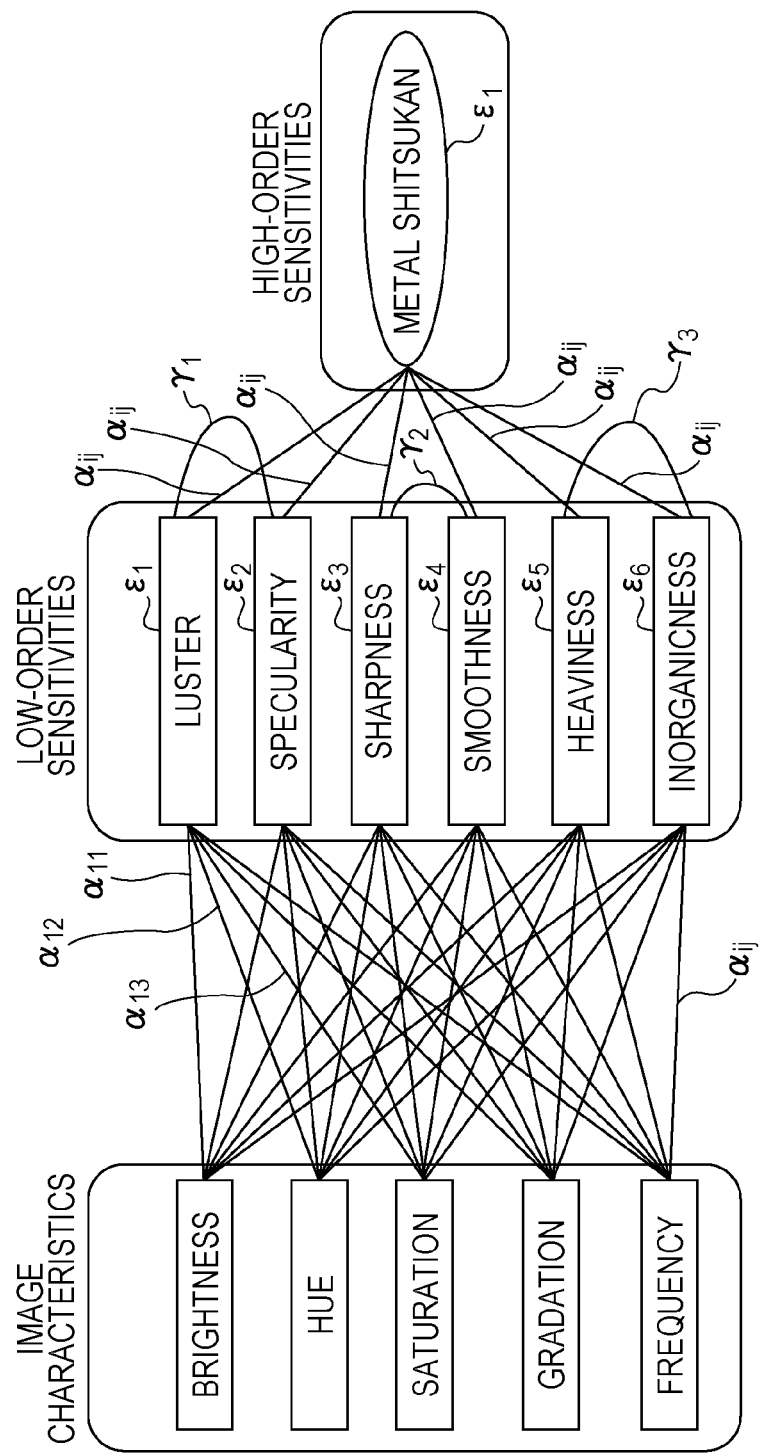
FIG. 11 illustrates a shitsukan recognition model in a sixth embodiment.

FIG. 11 illustrates a shitsukan recognition model according to a sixth embodiment. The configuration of the image processing apparatus according to the sixth embodiment is the same as that according to the first embodiment, except that the structure of the shitsukan recognition model is different from that of the shitsukan recognition model of the first embodiment. A shitsukan recognition model having a structure different from that of the first embodiment will be described.

As illustrated in FIG. 2, the shitsukan recognition model of the first embodiment has a structure in which all variables are linearly combined. In some cases, however, there may be correlations in the actually determined shitsukan recognition model that cannot be represented by a linear combination.

As illustrated in FIG. 11, a shitsukan recognition model including correlations of variables other than linear combinations may include correlations within the level of low-order sensitivities. In FIG. 11, such correlations are indicated by heavy lines, and the correlation factors are represented by γ.

FIG. 11 illustrates a shitsukan recognition model for metal shitsukan including correlations in the same level, where there is, for example, a correlation between luster and secularity. In this way, low-order sensitivities include independent low-order sensitivities and correlated low-order sensitivities. For the correlated low-order sensitivities, their correlation values include values that can be ignored and values that cannot be ignored.

The shitsukan recognition model of the first embodiment is a model in which the correlations of the low-order sensitivities are ignored on the basis of calculation and is represented by approximated linear combinations. In contrast, the shitsukan recognition model of the sixth embodiment is a more precise model and includes correlations that cannot be represented by linear combinations.

In the sixth embodiment, by using such a shitsukan recognition model taking into consideration correlations of the low-order sensitivities, precise shitsukan adjustment based on human sensitivity is possible.

Seventh Embodiment

Figure 12A:
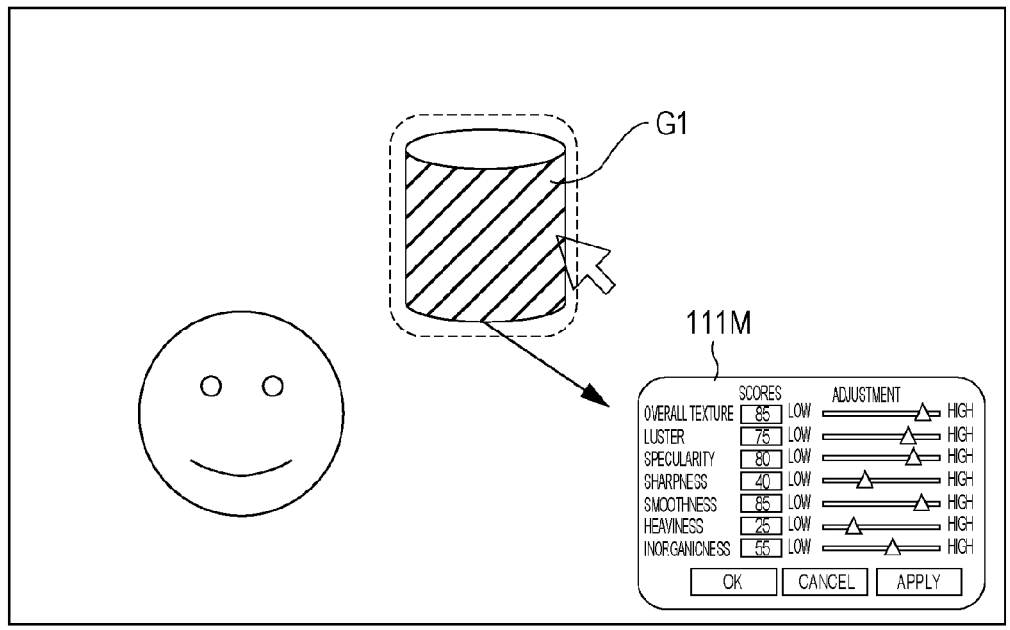
FIG. 12A illustrates a display mode of a parameter operating image.
Figure 12B:
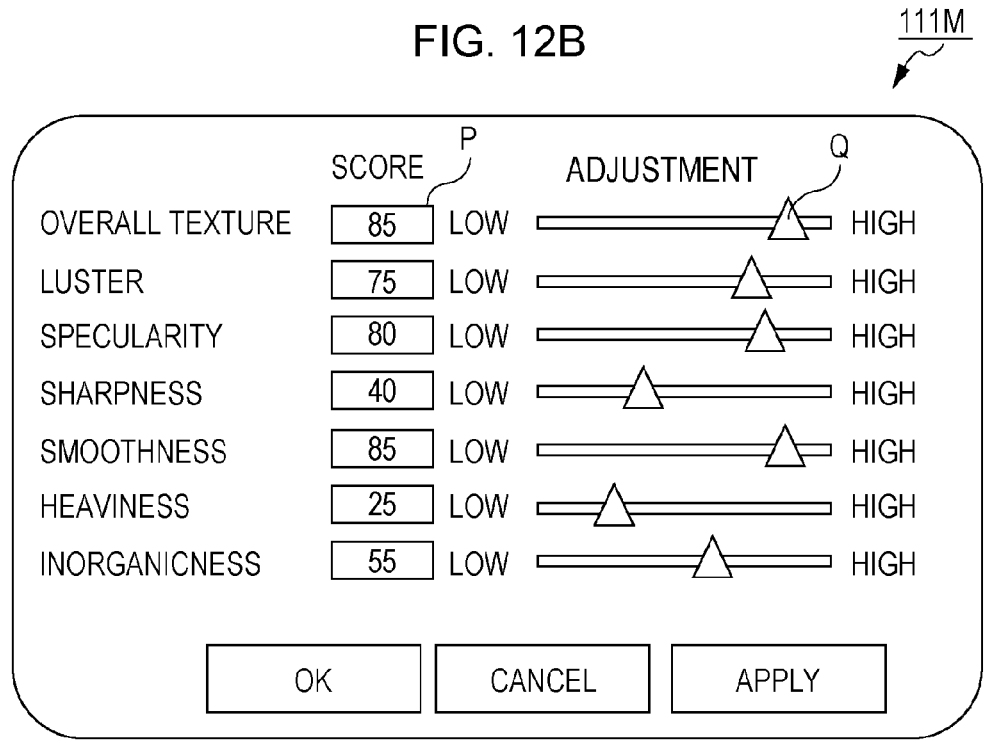
FIG. 12B illustrates a display mode of a parameter operating image.

FIGS. 12A and 12B illustrate a parameter operating image. In the third embodiment, shitsukan adjustment for automatically strengthening the shitsukan in accordance with the shitsukan evaluation results of the input image is performed. In such a case, when the processing result is not desirable to the user, image processing should be performed again.

As illustrated in FIG. 12A with reference to FIGS. 1A and 1B, the computer 100A performs shitsukan adjustment using a selected shitsukan recognition model in a region, and the result is reflected in the image region (metal) and displayed.

When a user positions a pointer (or clicks) on the shitsukan-adjusted region, a shitsukan-adjustment sub-window 111M, which is an example of a parameter operating image, is displayed. The user can confirm and perform fine adjustment of sensitivity evaluation values (scores) through the shitsukan-adjustment sub-window 111M.

As illustrated in FIG. 12B, various sensitivity evaluation values P and sliders Q for fine adjustment of various types of shitsukan are displayed in the shitsukan-adjustment sub-window 111M.

By moving the slider Q in the direction of HIGH or LOW, fine adjustment of the various sensitivities is possible. Since the initial sensitivity values are set such that the overall shitsukan evaluation value (score) is maximized, when the sliders for the sensitivity values are adjusted individually, the score of the overall shitsukan decreases when the sliders Q are moved in either the HIGH or LOW direction.

Since the slider Q of the overall shitsukan is initially set at a maximum value, the slider Q of the overall shitsukan cannot be slid further in the HIGH direction (i.e., the overall shitsukan cannot be increased). The sliders for the other types of shitsukan each have a unique adjustable range depending on the model applied and the features of the image region.

As illustrated in FIG. 12A, by positioning the pointer on the shitsukan-adjusted image, the shitsukan recognition model applied for the latest shitsukan adjustment can be confirmed.

Eighth Embodiment

In general, a plurality of materials is included in a single image, and therefore, a method of performing uniform shitsukan adjustment on the entire image has limits in achieving fine, high quality shitsukan.

In the embodiment described below, by adjusting shitsukan using an optimum shitsukan recognition model for each region in the image, an image with high quality shitsukan that appeals to human sensitivity can be generated.

Therefore, in the embodiment described below, when performing shitsukan adjustment of an image, an input image is segmented into regions; then, a shitsukan recognition model is selected for each segmented region; and the selected shitsukan recognition model is used only for the corresponding region. Since optimal image processing can be performed for each material depicted in the image, an image with high quality shitsukan can be obtained more effectively.

Figure 13:
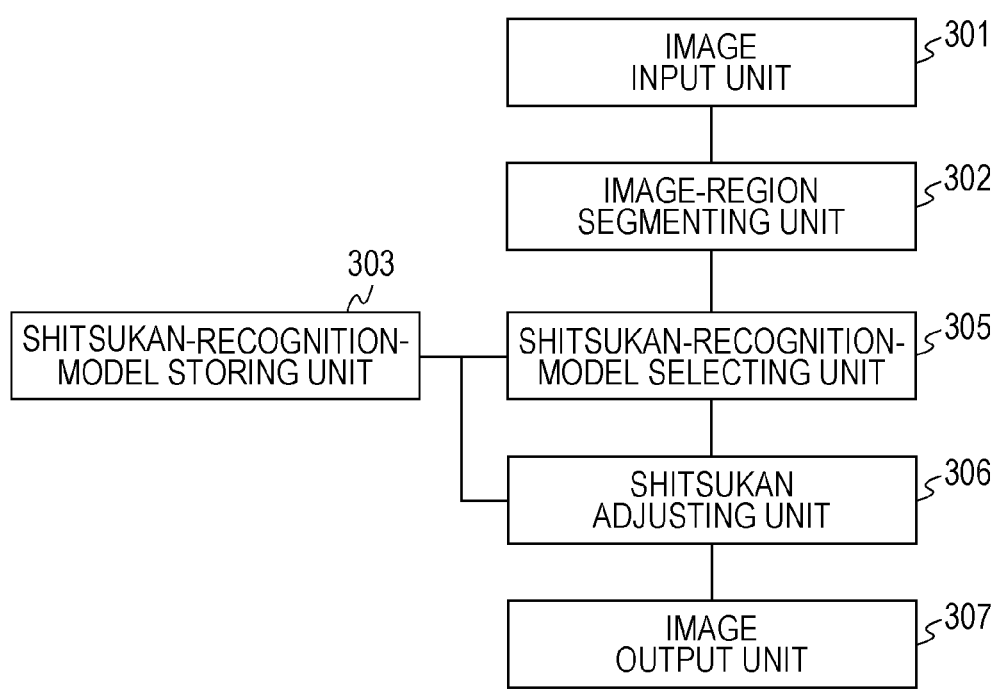
FIG. 13 is a block diagram illustrating the configuration of an image processing apparatus according to an eighth embodiment.
Figure 14A:
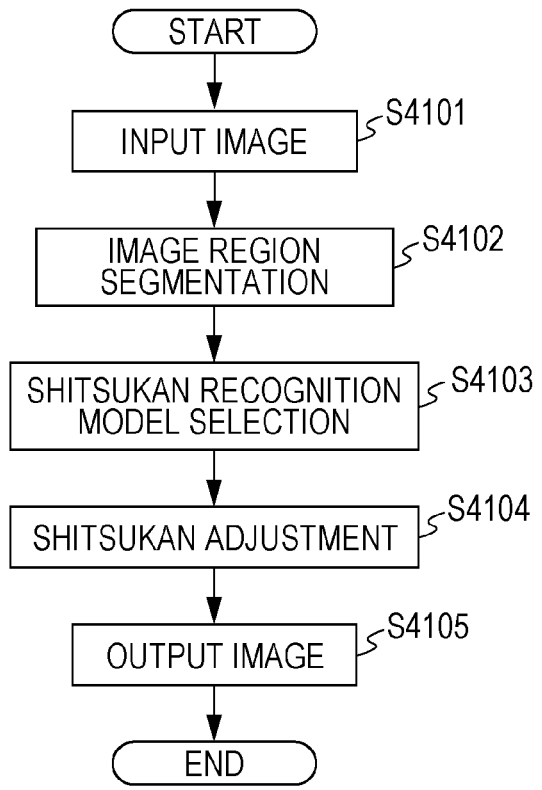
FIG. 14A is a flow chart illustrating image processing in the eighth embodiment.
Figure 14B:
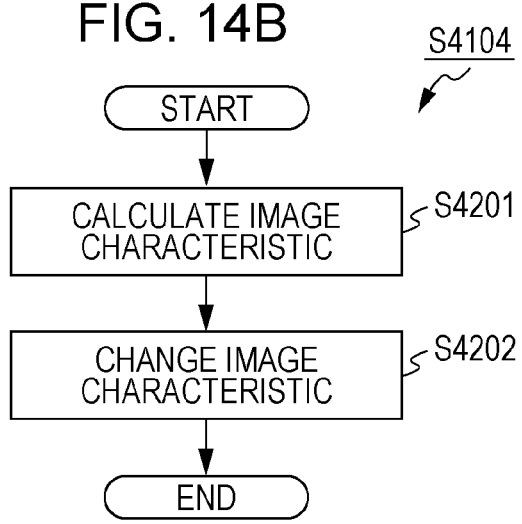
FIG. 14B is a flow chart illustrating image processing in the eighth embodiment.

FIG. 13 is a block diagram illustrating the configuration of an image processing apparatus according to an eighth embodiment. FIGS. 14A and 14B are flow charts illustrating image processing according to the eighth embodiment. FIG. 15 illustrates a screen display in the first half of the processing of the eighth embodiment. FIG. 16 illustrates a screen display in the second half of the processing of the eighth embodiment.

As illustrated in FIG. 13 with reference to FIG. 1A, an image of which shitsukan is to be adjusted is input to an image input unit 301. A image-region segmenting unit 302 (computer 100A) segments the input image into regions having different types of shitsukan in response to an instruction by the user. Data sets of a modeled structure used for human shitsukan recognition are stored for the different types of shitsukan in a shitsukan-adjustment unit 303 (computer 100A). A shitsukan-recognition-model selecting unit 305 (computer 100A) selects shitsukan recognition models to be used for the regions in response to the instructions by the user. A shitsukan-adjustment unit 306 (computer 100A) performs adjustment for improving shitsukan by using the selected shitsukan recognition model. The image output unit 307 outputs the shitsukan-adjusted image to the monitor screen 108 or to a storage medium for storage.

As illustrated in FIG. 13 with reference to FIG. 14A, an image of which the target shitsukan is adjusted is input to the image input unit 301 (S1101). As illustrated in (a) of FIG. 15, the input image is displayed on the monitor screen 108. The input image in this example includes a metal G1 and a human face G2, which are different materials, and therefore, different shitsukan recognition models are applied to these regions. The input image includes not only static images but also moving images. The image input unit 301 holds image processing programs for various types of image and video.

Next, the image-region segmenting unit 302, which is an example of a selecting unit, is capable of selecting an image region of a target material in the input image. By semi-automatically extracting the shitsukan regions to be adjusted, the input image data is segmented into regions corresponding to the various types of shitsukan (S1102). As illustrated in (b) of FIG. 15, the regions are segmented by moving a pointed such that the image region (metal G1) to be segmented is surrounded or by clicking the image region (metal G1) using a mouse. In region segmentation, regions are segmented by a segmentation method by edge extraction or a segmentation method by similar hue, and then regions of shitsukan to be adjusted are automatically segmented and extracted. Various methods may be used as a region segmentation method, however, the region segmentation method in this embodiment is not limited.

A fully manual method of extracting a region of shitsukan to be adjusted in which the contour of the region is traced by dragging a mouse may be used, or characters in the image may be assigned as unprocessed regions in advance to improve precision.

Next, the shitsukan-recognition-model selecting unit 305 receives the image segmented into region, and shitsukan recognition models to be used for the segmented regions are selected (S1103). As illustrated in (c) of FIG. 15, the result of segmentation of the image regions is displayed on the monitor screen 108, and the shitsukan recognition model to be used for each of the region can be selected using a pull-down menu positioned near each region. When an image segment (metal G1) is clicked using a mouse, a shitsukan-recognition-model selection menu (processing selection image) is displayed at a near position. As illustrated in (e) of FIG. 15, the user moves the pointer on the shitsukan-recognition-model selection menu and selects a shitsukan recognition model from the menu listing the shitsukan recognition models in order from the higher levels.

The shitsukan-adjustment unit 303 to correspond to a wide variation of shitsukan, a plurality of shitsukan recognition models is stored in the shitsukan-adjustment unit 303 in advance. Here, the wide variation of shitsukan includes various different materials, such as metal, skin, and fiber, or different appearances of the same material (for example, metal), such as luster and mat.

Next, the shitsukan-adjustment unit 306 adjusts the shitsukan in accordance with the information of the shitsukan recognition models used for the selected regions. A selected shitsukan recognition model is used in a corresponding region for shitsukan adjustment, and, as illustrated in (d) of FIG. 15, the result is reflected to the image region (metal G1) and displayed.

As illustrated in FIGS. 14A and 14B with reference to FIG. 13, a shitsukan-adjustment unit 306 calculates various different low-order-sensitivity parameters using a shitsukan recognition model (numerical value conversion equation) on an image region selected by a image-region segmenting unit 302 from the processed image. Then, conversion of the processed image is performed so that the various different low-order-sensitivity parameters calculated for the selected image region approach numerals satisfying specific relationships.

A shitsukan-adjustment unit 306 calculates the image characteristics for each segment of the image input at first (S4201). The image characteristics include brightness, hue, saturation, gradation, and frequency, as described above.

The shitsukan-adjustment unit 306 acquires a corresponding shitsukan recognition model from the shitsukan-adjustment unit 303 on the basis of information about shitsukan recognition models applied to the image regions and changes the image characteristics in accordance with the assigned shitsukan adjustment values (S4202).

The image characteristics are changed in accordance with the shitsukan adjustment values as follows. To change the image characteristics, the image characteristic values after the shitsukan is adjusted should be calculated first. Therefore, in a shitsukan recognition model illustrated in FIG. 2, calculation is performed by changing a upper level value, which is illustrated on the right side, and following a link from the high-order sensitivity on the right side, to a low-order sensitivity, and then to an image characteristic.

The calculation from the high-order sensitivity to a low-order sensitivity is represented by Equation 1.

Here, the factor $\alpha ij$ is a weighting factor representing correlation between the high-order sensitivity and the low-order sensitivity, and the factor $\epsilon i$ represents an error in the high-order sensitivity, including individual differences occurring when the shitsukan recognition model is constructed.
Here, i represents an evaluation item number of the low-order sensitivity, and j represents an evaluation item number of the high-order sensitivity. Zj represents an evaluation value of the shitsukan, and Yi represents of a low-order sensitivity values corresponding to a shitsukan adjustment value.

The next calculation from the low-order sensitivity to the image characteristic is represented by Equation 2.

Here, the factor $\beta ij$ is a weighting factor representing the correlation between the low-order sensitivity and the image characteristic, and the factor $\epsilon i$ represents an error in the low-order sensitivity, including individual differences occurring when the shitsukan recognition model is constructed. Here, i represents an evaluation item number of the low-order sensitivity, and j represents an evaluation item number of the high-order sensitivity. Yj represents a low-order sensitivity value corresponding to a shitsukan adjustment value, and Yi represents an image characteristic value taking into consideration all low-order sensitivity values corresponding to the shitsukan adjustment value. Thus, Xi corresponds to an image characteristic adjustment value corresponding to a shitsukan adjustment value.

In this way, the image characteristic values after shitsukan adjustment are calculated. The image characteristic values corresponding to the shitsukan adjustment values are stored in a look-up table (LUT) in advance, and image characteristic values corresponding to the shitsukan adjustment values may be selected.

After calculating the image characteristic values, image processing for approximating the image characteristics to the calculated image characteristic values is performed. For brightness, hue, and saturation, the values may be directly changed to values corresponding to those after adjustment. Various method are proposed for gradation and frequency, in which, for example, gradation is changed by performing tone curve processing and frequency is changed by performing edge enhancement or smoothing. In the eighth embodiment, the image characteristic values are changed to the image characteristic value after shitsukan adjustment, but the processing for changing the image characteristics is not limited.

Subsequently, as illustrated in (a) to (c) in FIG. 16, similar operation and processing are performed on a human face G2, which is an unprocessed region in the input image.

After all steps of shitsukan adjustment are completed, the image output unit 307 outputs the shitsukan-adjusted image to a display device, an image output device, and a storage medium (S4105). When the application of shitsukan recognition models to all regions is completed, the image is saved and/or output. As illustrated in (d) of FIG. 16, this operation is performed by operating a separately-provided save button B or a pull-down menu.

In the eighth embodiment, the image is a still image. However, a video image may also be used. Thus, the image processing of the eighth embodiment may be incorporated in an image pick-up device, a display device, or an image output device to acquire shitsukan-adjusted images and thus, can be used in a wider range of devices.

Ninth Embodiment

Figure 17:
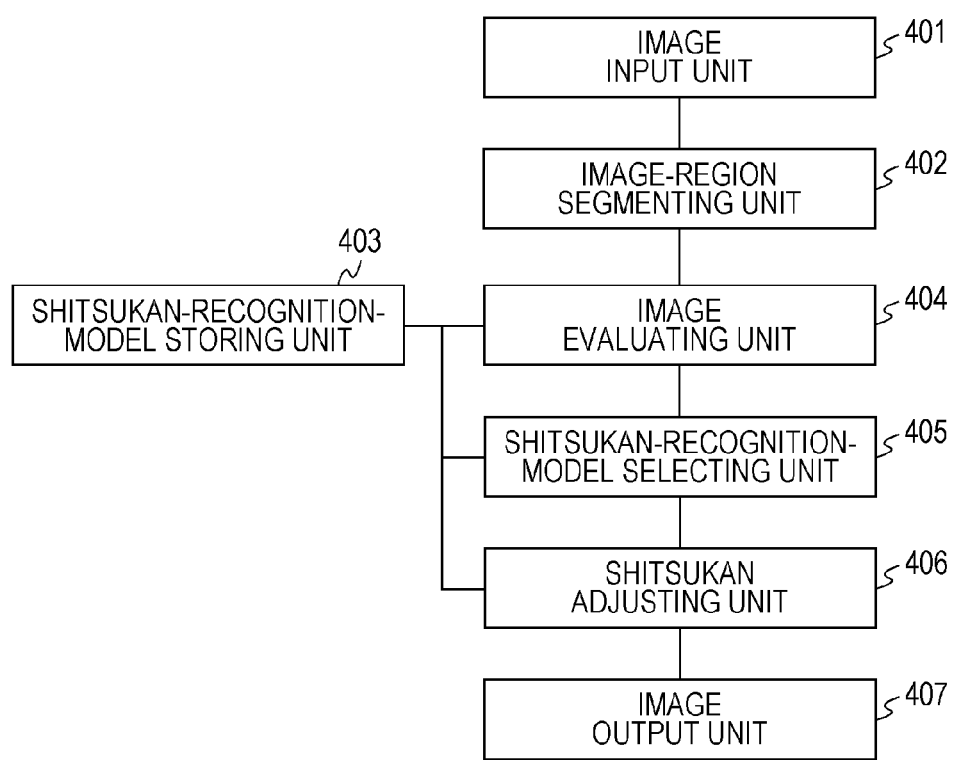
FIG. 17 is a block diagram illustrating the configuration of an image processing apparatus according to a ninth embodiment.

FIG. 17 is a block diagram illustrating the configuration of an image processing apparatus according to a ninth embodiment. FIG. 18 is a flow chart illustrating image processing of the ninth embodiment. FIGS. 19A and 19B are flow charts illustrating image evaluation and shitsukan adjustment, respectively. FIG. 20 illustrates a screen display of the ninth embodiment.

As illustrated in FIG. 17, the image processing apparatus according to the ninth embodiment is the same as the image processing apparatus according to the eighth embodiment illustrated in FIG. 13, except that an image evaluating unit 404, which is not provided for the eighth embodiment, is added.

As illustrated in FIG. 18 with reference to FIG. 17, first, an input image is input to an image input unit 401 (S5101). As illustrated in (a) of FIG. 15, the input image is displayed on the monitor screen 108. An image-region segmenting unit 402 extracts a shitsukan area to be adjusted from the input image and segments it into regions of different types of shitsukan. As illustrated in (b) of FIG. 15, a regions is segmented by the user assigning an image region (metal G1) to be segmented.

The image evaluating unit 404 performs shitsukan evaluation for each region selected in the input image (S5103). Since this is internal processing, the screen display is unchanged. Evaluation values of the high-order sensitivities (shitsukan) for the regions are calculated using a plurality of stored shitsukan recognition models.

As illustrated in (a) of FIGS. 19A and 19B with reference to FIG. 17, the image evaluating unit 404 calculates the image characteristics for each selected region in the input image through the same processing as that performed in Step S4201 of the eighth embodiment. Next, the calculated image characteristic values and the shitsukan recognition models corresponding to the various types of shitsukan stored in the shitsukan-recognition-model storing unit 403 are used to calculate shitsukan evaluation values of the input image regions for shitsukan recognition models (S5202).

As illustrated in FIG. 2, in the shitsukan recognition model, the evaluation values at nodes are calculated by following the links from the image characteristics on the left side toward right side to the low-order sensitivities and the high-order sensitivity.

Here, the factor $\alpha ij$ is a weighting factor representing the weight between evaluation items, and the factor $\epsilon i$ represents an error in the evaluation items, including individual differences occurring when the shitsukan recognition model is constructed. Here, i represents an evaluation item number of a low-order sensitivity, and j represents an evaluation item number of a high-order sensitivity.
Xj represents an evaluation value of an evaluation item in a level one level lower than the target level, and Yi represents an evaluation value in the target level.

For example, when the low-order sensitivities are in the target level, Xj represents an image characteristic in the level on the left side in the drawing, and Yi represents an evaluation value of a low-order sensitivity. Similarly, when the low-order sensitivities are in the target level, Xj represents an evaluation value of a low-order sensitivity, and Yj represents a shitsukan evaluation value, which is a high-order sensitivity.

Thus, the evaluation values of the low-order sensitivities are calculated using the image characteristics, which are the calculated physical characteristics, and the final high-order sensitivities can be obtained using the evaluation values of the low-order sensitivities.

Here, the evaluation values are obtained through calculation. However, to calculate the evaluation values at high speed, Equation 3 may be calculated with various values in advance and stored in a look-up table (LUT).

After the image evaluating unit 404 calculates the evaluation values of the high-order sensitivities for the shitsukan recognition models of all image regions, Step S5103 is completed.

Next, the shitsukan-recognition-model selecting unit 405 selects the shitsukan recognition models to be applied to the regions on the basis of the evaluation values determined by the image evaluating unit 404 in Step S5103 (S5104). Basically, the shitsukan recognition model that provides the largest evaluation value of the high-order sensitivity is selected as the shitsukan recognition model suitable for the corresponding image region. At this time, there is no change in the screen display since this is internal processing.

However, when an evaluation value of a low-order sensitivity satisfies a specific condition described below, it is determined that no model is suitable, and shitsukan adjustment (S5105) of the corresponding the image region is not performed. In this way, incorrect and/or unwanted shitsukan adjustment is prevented.

(1) When evaluation values are small no matter which shitsukan recognition model is used, and it is determined that a shitsukan recognition model corresponding to the material is not stored.

(2) When the evaluation values are similar no matter which shitsukan recognition model is used, and it is determined that a shitsukan recognition model cannot be selected.

(3) When shitsukan adjustment is unnecessary since the image region is a character.

The shitsukan adjusting unit 406 selects the image characteristics to be adjusted on the basis of the evaluation values of the low-order sensitivities and the high-order sensitivity calculated by the image evaluating unit 404. The shitsukan adjusting unit 406 first determines whether the shitsukan level is high or low on the basis of the evaluation value of the high-order sensitivity. Then, when the shitsukan level is low, processing to strengthen the shitsukan is performed, whereas, when the shitsukan level is high, processing to weaken the shitsukan is performed.

The shitsukan adjusting unit 406 determines which shitsukan is to be adjusted in what way and then determines which image characteristics are to be changed to what extent.

At this time, since an image characteristic influences evaluation values of other low-order sensitivities, the image characteristic to be changed and the level of change should be determined with reference to the evaluation values of the other low-order sensitivities.

As illustrated in (b) of FIGS. 19A and 19B with reference to FIG. 17, the shitsukan adjusting unit 406 determines the image characteristics to be changed and the levels of change in the image characteristics. The shitsukan adjusting unit 406 first determines the lowest value in the evaluation values of low-order sensitivities that influence the evaluation value of the high-order sensitivity (S5301). Then, the image characteristic having the greatest influence on the selected low-order sensitivity is selected on the basis of the weighting factors (S5302).

The shitsukan adjusting unit 406 recalculates the evaluation values of the low-order sensitivities for when the selected image characteristic is adjusted (S5303) and determines whether the evaluation values of the low-order sensitivities reach a target value (S5304).

When the evaluation values of the low-order sensitivities do not reach the target value, the adjustment values are changed so that the target value is reached. Since a large change in the image characteristics may cause the image to generate an unpleasant sensation, a maximum value for adjustment is set, and adjustment larger than this value is not performed.

Thus, when the low-order sensitivities do not reach the target value within the adjustable range (NO in S5304), the process returns to Step S5302 to change the value of the image characteristics that has the next greatest influence. When the target value is reached (YES in S5304), the process proceeds to Step S5305.

The shitsukan adjusting unit 406 recalculates the evaluation values of the high-order sensitivities for when the selected low-order sensitivities are adjusted (S5305) and determines whether the evaluation value of the high-order sensitivity reaches a target value (S5306). When the target value is not reached (NO in S5306), the process returns to Step S5301, and Steps S5301 to S5306 are repeated to adjust the low-order sensitivity having the next greatest influence. When the evaluation values reach the target value (YES in S5306), the process proceeds to Step S5307.

The shitsukan adjusting unit 406 performs image processing similar to that performed in the eighth embodiment so as to satisfy the levels of change for the image characteristics determined to be changed through the steps up to this point (S5307), and the processing in Step S5105 ends.

As illustrated in (a) of FIG. 20, the shitsukan adjusting unit 406 performs shitsukan adjustment by applying a selected shitsukan recognition model to a region, and the result is reflected and displayed in that image region (metal) (S5105).

When the user moves a pointer (or clicks) on the shitsukan-adjusted region, a shitsukan-recognition-model adjusting sub-window, which is an example of a parameter display image, is displayed. Through the shitsukan-recognition-model adjusting sub-window, the user can confirm the type of the shitsukan recognition model applied and perform fine adjustment of the sensitivity evaluation values (scores).

As illustrated in (b) of FIG. 20, the currently applied shitsukan recognition model M, the sensitivity evaluation values P, and sliders Q for fine adjustment of the various types of shitsukan are displayed in the shitsukan-recognition-model adjusting sub-window.

When the shitsukan recognition model applied through automatic processing is determined to be unsuitable, the user can clicked on a button N to open a shitsukan-recognition-model selection menu (processing selection image). The shitsukan recognition model to be applied can be switched manually using the shitsukan-recognition-model selection menu.

When ORIGINAL is selected from the shitsukan-recognition-model selection menu, the original sensitivity evaluation values of an input image to which a shitsukan recognition model have not yet been applied are displayed.

Fine adjustment of the sensitivities is possible by moving the sliders in the HIGH or LOW direction. Since the initial sensitivity values are set such that the overall shitsukan evaluation value (score) is maximized, when the sliders for the sensitivities are adjusted individually, the score of the overall shitsukan decreases when the sliders Q are moved in either the HIGH or LOW direction.

Since the slider Q of the overall shitsukan is initially set at a maximum value, the slider Q of the overall shitsukan cannot be slid further in the HIGH direction (i.e., the overall shitsukan cannot be increased).

The sliders for other sensitivities each have a unique adjustable range depending on the model applied and the features of the image region.

As illustrated in (d) of FIG. 20, the selected shitsukan recognition model is applied to perform shitsukan adjustment on an image region of a human face, and the result is reflected and displayed in the corresponding image region.

By moving the pointer onto the shitsukan-adjusted region, a hierarchical display image of the applied shitsukan recognition model is displayed near the region. The applied shitsukan recognition model can be confirmed through the hierarchical display image.

The image output unit 407 outputs an image in the same manner as in the eighth embodiment (S5106). As illustrated in (d) of FIG. 16, a save button B can be operated to end the process of image processing and to output an image.

Since image processing for adjusting the shitsukan is performed in the ninth embodiment, an image on which shitsukan adjustment based on human sensitivity has been performed can be provided. At this time, by adding shitsukan evaluation, the user does not have to input shitsukan adjustment values, and optimal shitsukan adjustment based on an automatically-selected shitsukan recognition model most suitable for the image region can be performed.

Furthermore, since shitsukan evaluation is performed instead of performing adjustment on all low-order sensitivities, weak low-order sensitivities can be adjusted, and shitsukan adjustment based on human sensitivity can be performed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-022192, filed Feb. 3, 2010 and Japanese Patent Application No. 2010-031186, filed Feb. 16, 2010, which is hereby incorporated by reference herein in its entirety.

The invention claimed is:

1. An image processing apparatus configured to convert an input image to generate an output image having image shitsukan different from the image shitsukan of the input image by using an adjusting unit capable of individually adjusting various different physical image characteristics extracted from the input image and interactively adjusting the various different physical image characteristics, the apparatus comprising:
a first numerical converting unit configured to be represented by a hierarchical model having a first level defining a relationship between the image characteristics and latent sensation received by humans from an image and a second level defining a relationship between the latent sensation and the shitsukan, in correspondence with human shitsukan recognition structure, the first level and the second level being different from each other, and configured to convert various different image-characteristic parameters quantifying the image characteristics to various different low-order sensitivity parameters quantifying latent sensations experienced by humans when viewing an image,
wherein the various different low-order sensitivity parameter calculated from the output image are converted by the first numerical converting unit to approach numerical values satisfying a predetermined relationship; and
a second numerical converting unit configured to be represented by the hierarchical model and to convert the various different low-order-sensitivity parameters to high-order-sensitivity parameters quantifying shitsukan for different materials depicted in an image,
wherein the high-order-sensitivity parameters calculated from the output image are converted by the first numerical converting unit and the second numerical converting unit to approach predetermined numerical values.

2. An image processing apparatus configured to convert an input image to generate an output image having image shitsukan different from the image shitsukan of the input image by using an adjusting unit capable of individually adjusting various different physical image characteristics extracted from the input image and interactively adjusting the various different physical image characteristics, the apparatus comprising:
a first numerical converting unit configured to be represented by a hierarchical model having a first level defining a relationship between the image characteristics and latent sensation received by humans from an image and a second level defining a relationship between the latent sensation and the shitsukan, in correspondence with human shitsukan recognition structure, the first level and the second level being different from each other, and configured to convert various different image-characteristic parameters quantifying the image characteristics to low-order-sensitivity parameters quantifying latent sensations experienced by humans when viewing an image,
wherein the low-order-sensitivity parameters calculated from the output image are converted by the first numerical converting unit to approach predetermined numerical values; and
a second numerical converting unit configured to be represented by the hierarchical model and to convert the various different low-order-sensitivity parameters to high-order-sensitivity parameters quantifying shitsukan for different materials depicted in an image,
wherein the high-order-sensitivity parameters calculated from the output image are converted by the first numerical converting unit and the second numerical converting unit to approach predetermined numerical values.

3. The image processing apparatus according to claim 1, wherein the image characteristics parameter of the output image, the low-order-sensitivity parameters of the output image and the output image are displayable on one screen.

4. The image processing apparatus according to claim 1, wherein the image characteristics parameter of the output image, the high-order-sensitivity parameters of the output image and the output image are displayable on one screen.

5. An image processing apparatus configured to convert an input image to generate an output image having image shitsukan different from the image shitsukan of the input image by using an adjusting unit capable of individually adjusting various different physical image characteristics extracted from the input image and interactively adjusting the various different physical image characteristics, the apparatus comprising:
a numerical converting unit configured to be represented by a hierarchical model having a first level defining a relationship between the image characteristics and latent sensation received by humans from an image and a second level defining a relationship between the latent sensation and the shitsukan, in correspondence with human shitsukan recognition structure, the first level and the second level being different from each other, and configured to convert various different image-characteristic parameters quantifying the image characteristics to high-order-sensitivity parameters quantifying shitsukan for different materials depicted in an image, wherein the high-order-sensitivity parameters calculated from the output image are converted by the numerical converting unit to approach predetermined numerical values.

6. A program encoded on a non-transitory computer readable medium instructing a computer to convert an input image to generate an output image having image shitsukan different from the image shitsukan of the input image by using an adjusting unit capable of individually adjusting various different physical image characteristics extracted from the input image and interactively adjusting the various different physical image characteristics, the apparatus comprising:

a first numerical converting unit configured to be represented by a hierarchical model having a first level defining a relationship between the image characteristics and latent sensation received by humans from an image and a second level defining a relationship between the latent sensation and the shitsukan, in correspondence with human shitsukan recognition structure, the first level and the second level being different from each other, and configured to convert various different image-characteristic parameters quantifying the image characteristics to various different low-order-sensitivity parameters quantifying latent sensations experienced by humans when viewing an image, wherein the various different low-order-sensitivity parameters calculated from the output image are converted by the first numerical converting unit to approach numerical values satisfying a predetermined relationship; and a second numerical converting unit configured to be represented by the hierarchical model and to convert the various different low-order-sensitivity parameters to high-order-sensitivity parameters quantifying shitsukan for different materials depicted in an image, wherein the high-order-sensitivity parameters calculated from the output image are converted by the first numerical converting unit and the second numerical converting unit to approach predetermined numerical values.

7. The program according to claim 6, wherein the image characteristics parameter of the output image, the low-order-sensitivity parameters of the output image and the output image are displayable on one screen.

8. The program according to claim 6, wherein the image characteristics parameter of the output image, the high-order-sensitivity parameters of the output image and the output image are displayable on one screen.

9. A method of producing the program according to claim 6, comprising the steps of:

preparing a plurality of evaluation images having various different physical image characteristics independently or interactively changed from the physical image characteristics of an original image depicting a material having specific shitsukan by performing image processing;

measuring degrees of contribution of various different latent sensations to the individual image characteristics through a subject performing comparative examination of the plurality of evaluation images and evaluating a level of sensuous change in the various different latent sensations experienced by humans when viewing an image; and acquiring the first numerical converting unit by performing statistical processing on measurement results of the degrees of contribution of the various different latent sensations to the individual image characteristics.

10. The method of producing the program according to claim 9, wherein, in the measuring step, the subject is a plurality of subjects.

11. The method of producing the program according to claim 9, wherein, in the preparing step, the evaluation images are displayed on a display medium on which the output image is displayed, and wherein the measuring step is performed using the evaluation images displayed on the display medium.

12. A program encoded on a non-transitory computer readable medium instructing a computer to convert an input image to generate an output image having image shitsukan different from the image shitsukan of the input image by using an adjusting unit capable of individually adjusting various different physical image characteristics extracted from the input image and interactively adjusting the various different physical image characteristics, the apparatus comprising:

a first numerical converting unit configured to be represented by a hierarchical model having a first level defining a relationship between the image characteristics and latent sensation received by humans from an image and a second level defining a relationship between the latent sensation and the shitsukan, in correspondence with human shitsukan recognition structure, the first level and the second level being different from each other, and configured to convert various different image-characteristic parameters quantifying the image characteristics to various different low-order-sensitivity parameters quantifying latent sensations experienced by humans when viewing an image, wherein the low-order-sensitivity parameters calculated from the output image are converted by the first numerical converting unit to approach predetermined numerical values; and a second numerical converting unit configured to be represented by the hierarchical model and to convert the various different low-order-sensitivity parameters to high-order-sensitivity parameters quantifying shitsukan for different materials depicted in an image, wherein the high-order-sensitivity parameters calculated from the output image are converted by the first numerical converting unit and the second numerical converting unit to approach predetermined numerical values.

13. A program encoded on a non-transitory computer readable medium instructing a computer to convert an input image to generate an output image having image shitsukan different from the image shitsukan of the input image by using an adjusting unit capable of individually adjusting various different physical image characteristics extracted from the input image and interactively adjusting the various different physical image characteristics, the apparatus comprising:

a numerical converting unit configured to be represented by a hierarchical model having a first level defining a relationship between the image characteristics and latent sensation received by humans from an image and a second level defining a relationship between the latent sensation and the shitsukan, in correspondence with human shitsukan recognition structure, the first level and the second level being different from each other, and configured to convert various different image-characteristic parameters quantifying the image characteristics to high-order-sensitivity parameters quantifying shitsukan for different materials depicted in an image, wherein the high-order-sensitivity parameters calculated from the output image are converted by the numerical converting unit to approach predetermined numerical values.

14. A method of producing the program according to claim 13, comprising the steps of:
preparing a plurality of evaluation images having various different physical image characteristics independently or interactively changed from the physical image characteristics of an original image depicting a material having specific shitsukan by performing image processing;
measuring degrees of contribution of various different latent sensations to the individual image characteristics through a subject performing comparative examination of the evaluation images and evaluating an level of sensuous change in shitsukan of different materials depicted in an image; and
acquiring the numerical converting unit by performing statistical processing on measurement results of the degrees of contribution of the shitsukan to the individual image characteristics.

15. An image processing apparatus configured to convert an input image to generate an output image having image shitsukan different from the image shitsukan of the input image by using an adjusting unit capable of individually adjusting various different physical image characteristic extracted from the input image and interactively adjusting the various different physical image characteristics, the apparatus comprising:
a first numerical converting unit configured to be represented by a hierarchical model having a first level defining a relationship between the image characteristics and latent sensation received by humans from an image and a second level defining a relationship between the latent sensation and the shitsukan, in correspondence with human shitsukan recognition structure, the first level and the second level being different from each other, and configured to convert various different image-characteristic parameters quantifying the image characteristics to various different low-order-sensitivity parameters quantifying latent sensations experienced by humans when viewing an image; and
a selecting unit configured to select an image region of a specific material in the input image,
wherein the various different low-order-sensitivity parameters calculated from the image region in the output image selected by the selecting unit are converted by the first numerical converting unit to approach numerical values satisfying a predetermined relationship; and
a second numerical converting unit configured to be represented by the hierarchical model and to convert the various different low-order-sensitivity parameters to high-order-sensitivity parameters quantifying shitsukan for different materials depicted in an image,
wherein, with respect to the image region selected by the selecting unit, the high-order-sensitivity parameters calculated from the image region of the output image are converted by the first numerical converting unit and the second numerical converting unit to approach predetermined numerical values.

16. The image processing apparatus according to claim 15, further comprising:
a display device configured to display at least one of the input image and the output image,
wherein the low-order-sensitivity parameters are displayed at a position near the image region displayed on the display device.

17. The image processing apparatus according to claim 15, further comprising:
a display device configured to display at least one of the input image and the output image,
wherein the high-order-sensitivity parameters are displayed at a position near the image region displayed on the display device.

18. An image processing apparatus configured to convert an input image to generate an output image having image shitsukan different from the image shitsukan of the input image by using an adjusting unit capable of individually adjusting various different physical image characteristics extracted from the input image and interactively adjusting the various different physical image characteristics, the apparatus comprising:
a first numerical converting unit configured to be represented by a hierarchical model having a first level defining a relationship between the image characteristics and latent sensation received by humans from an image and a second level defining a relationship between the latent sensation and the shitsukan, in correspondence with human shitsukan recognition structure, the first level and the second level being different from each other, and configured to convert various different image-characteristic parameters quantifying the image characteristics to low-order-sensitivity parameters quantifying latent sensations experienced by humans when viewing an image; and
a selecting unit configured to select an image region of a specific material in the input image,
wherein the various different low-order-sensitivity parameters calculated from the image region in the output image selected by the selecting unit are converted by the first numerical converting unit to approach predetermined numerical values; and a second numerical converting unit configured to be represented by the hierarchical model and to convert the various different low-order-sensitivity parameters to high-order-sensitivity parameters quantifying shitsukan for different materials depicted in an image,
wherein, with respect to the image region selected by the selecting unit, the high-order-sensitivity parameters calculated from the image region of the output image are converted by the first numerical converting unit and the second numerical converting unit to approach predetermined numerical values.

19. An image processing apparatus configured to convert an input image to generate an output image having image shitsukan different from the image shitsukan of the input image by using an adjusting unit capable of individually adjusting various different physical image characteristics extracted from the input image and interactively adjusting the various different physical image characteristics, the apparatus comprising:
a numerical converting unit configured to be represented by a hierarchical model having a first level defining a relationship between the image characteristics and latent sensation received by humans from an image and a second level defining a relationship between the latent sensation and the shitsukan, in correspondence with human shitsukan recognition structure, the first level and the second level being different from each other, and configured to convert various different image-characteristic parameters quantifying the image characteristics to high-order-sensitivity parameters quantifying shitsukan for different materials depicted in an image; and a selecting unit configured to select an image region of a specific material in the input image, wherein the high-order-sensitivity parameters calculated from the image region in the output image selected by the selecting unit are converted by the numerical converting unit to approach predetermined numerical values.

20. A program encoded on a non-transitory computer readable medium instructing a computer to convert an input image to generate an output image having image shitsukan different from the image shitsukan of the input image by using an adjusting unit capable of individually adjusting various different physical image characteristic extracted from the input image and interactively adjusting the various different physical image characteristics, the apparatus comprising:

a first numerical converting unit configured to be represented by a hierarchical model having a first level defining a relationship between the image characteristics and latent sensation received by humans from an image and a second level defining a relationship between the latent sensation and the shitsukan, in correspondence with human shitsukan recognition structure, the first level and the second level being different from each other, and configured to convert various different image-characteristic parameters quantifying the image characteristics to various different low-order-sensitivity parameters quantifying latent sensations experienced by humans when viewing an image; and a selecting unit configured to select an image region of a specific material in the input image, wherein the various different low-order-sensitivity parameters calculated from the image region of the output image selected by the selecting unit are converted by the first numerical converting unit to approach numerical values satisfying a predetermined relationship; and a second numerical converting unit configured to be represented by the hierarchical model and to convert the various different low-order-sensitivity parameters to high-order-sensitivity parameters quantifying shitsukan for different materials depicted in an image, wherein, with respect to the image region selected by the selecting unit, the high-order-sensitivity parameters calculated from the image region of the output image are converted by the first numerical converting unit and the second numerical converting unit to approach predetermined numerical values.

21. The program according to claim 20, further comprising a step of:

displaying at least one of the input image and the output image on a display device, wherein the low-order-sensitivity parameters are displayed at a position near the image region displayed on the display device.

22. The program according to claim 20, further comprising a step of:

displaying at least one of the input image and the output image on a display device, wherein the high-order-sensitivity parameters are displayed at a position near the image region displayed on the display device.

23. A method of producing the program according to claim 20, comprising the steps of:

preparing a plurality of evaluation images having various different physical image characteristics independently or interactively changed from the physical image characteristics of an original image depicting a material having specific shitsukan by performing image processing;

measuring degrees of contribution of various different latent sensations to the individual image characteristics through a subject performing comparative examination of the plurality of evaluation images and evaluating a level of sensuous change in the various different latent sensations experienced by humans when viewing an image; and acquiring the first numerical converting unit by performing statistical processing on measurement results of the degrees of contribution of the various different latent sensations to the individual image characteristics.

24. The method of producing the program according to claim 23, wherein, in the measuring step, the subject is a plurality of subjects.

25. The method of producing the program according to claim 23, wherein, in the preparing step, the evaluation images are displayed on a display medium on which the output image is displayed, and wherein the measuring step is performed using the evaluation images displayed on the display medium.

26. A program encoded on a non-transitory computer readable medium instructing a computer to convert an input image to generate an output image having image shitsukan different from the image shitsukan of the input image by using an adjusting unit capable of individually adjusting various different physical image characteristics extracted from the input image and interactively adjusting the various different physical image characteristics, the apparatus comprising:

a first numerical converting unit configured to be represented by a hierarchical model having a first level defining a relationship between the image characteristics and latent sensation received by humans from an image and a second level defining a relationship between the latent sensation and the shitsukan, in correspondence with human shitsukan recognition structure, the first level and the second level being different from each other, and configured to convert various different image-characteristic parameters quantifying the image characteristics to low-order-sensitivity parameters quantifying latent sensations experienced by humans when viewing an image; and a selecting unit configured to select an image region of a specific material in the input image, wherein the low-order-sensitivity parameters calculated from the image region of the output image selected by the selecting unit are converted by the first numerical converting unit to approach predetermined numerical values; and a second numerical converting unit configured to be represented by the hierarchical model and to convert the various different low-order-sensitivity parameters to high-order-sensitivity parameters quantifying shitsukan for different materials depicted in an image, wherein, with respect to the image region selected by the selecting unit, the high-order-sensitivity parameters calculated from the image region of the output image are converted by the first numerical converting unit and the second numerical converting unit to approach predetermined numerical values.

27. A program encoded on a non-transitory computer readable medium instructing a computer to convert an input image to generate an output image having image shitsukan different from the image shitsukan of the input image by using an adjusting unit capable of individually adjusting various different physical image characteristic extracted from the input image and interactively adjusting the various different physical image characteristics, the apparatus comprising:

a numerical converting unit configured to be represented by a hierarchical model having a first level defining a relationship between the image characteristics and latent sensation received by humans from an image and a second level defining a relationship between the latent sensation and the shitsukan, in correspondence with human shitsukan recognition structure, the first level and the second level being different from each other, and configured to convert various different image-characteristic parameters quantifying the image characteristics to high-order-sensitivity parameters quantifying shitsukan for different materials depicted in an image; and a selecting unit configured to select an image region of a target material in the input image, wherein the high-order-sensitivity parameters calculated from the image region of the output image selected by the selecting unit are converted by the numerical converting unit to approach predetermined numerical values.

28. A method of producing the program according to claim 27, comprising the steps of:

preparing a plurality of evaluation images having various different physical image characteristics independently or interactively changed from the physical image characteristics of an original image depicting a material having specific shitsukan by performing image processing;

measuring degrees of contribution of various different latent sensations to the individual image characteristics through a subject performing comparative examination of the evaluation images and evaluating an level of sensuous change in shitsukan of different materials depicted in an image; and acquiring the numerical converting unit by performing statistical processing on measurement results of the degrees of contribution of the shitsukan to the individual image characteristics.

* * * * *